US011243460B2

(12) United States Patent
Hu et al.

(10) Patent No.: US 11,243,460 B2
(45) Date of Patent: Feb. 8, 2022

(54) LIGHT SOURCE DEVICE AND PROJECTION SYSTEM

(71) Applicant: APPOTRONICS CORPORATION LIMITED, Guangdong (CN)

(72) Inventors: Fei Hu, Shenzhen (CN); Zuqiang Guo, Shenzhen (CN); Peng Du, Shenzhen (CN); Lin Mi, Shenzhen (CN); Yi Li, Shenzhen (CN)

(73) Assignee: APPOTRONICS CORPORATION LIMITED, Guangdong (CN)

( * ) Notice: Subject to any disclaimer, the term of this patent is extended or adjusted under 35 U.S.C. 154(b) by 106 days.

(21) Appl. No.: 16/493,972

(22) PCT Filed: Apr. 20, 2017

(86) PCT No.: PCT/CN2017/081311
§ 371 (c)(1),
(2) Date: Sep. 13, 2019

(87) PCT Pub. No.: WO2018/166038
PCT Pub. Date: Sep. 20, 2018

(65) Prior Publication Data

US 2020/0124955 A1 Apr. 23, 2020

(30) Foreign Application Priority Data

Mar. 14, 2017 (CN) ........................ 201710150667.3

(51) Int. Cl.
*G03B 21/14* (2006.01)
*G03B 21/20* (2006.01)

(52) U.S. Cl.
CPC ....... *G03B 21/2066* (2013.01); *G03B 21/204* (2013.01); *G03B 21/208* (2013.01)

(58) Field of Classification Search
CPC G03B 21/204; G03B 21/2066; G03B 21/208; G02B 26/008
See application file for complete search history.

(56) References Cited

U.S. PATENT DOCUMENTS

2012/0127435 A1* 5/2012 Kitano .............. G03B 21/2066 353/20
2013/0176540 A1* 7/2013 Wei ..................... G02B 27/286 353/20

(Continued)

FOREIGN PATENT DOCUMENTS

CN 1453605 A 11/2003
CN 100394249 C 6/2008

(Continued)

OTHER PUBLICATIONS

Extended European Search Report of corresponding European Patent Application No. 17901192.9—6 pages (dated Mar. 16, 2020).

(Continued)

*Primary Examiner* — Andrew J Coughlin
(74) *Attorney, Agent, or Firm* — Knobbe, Martens, Olson & Bear LLP

(57) ABSTRACT

Provided is a light source device including a first light source, a light guiding system and a wavelength conversion device. The first light source emits first exciting light which is incident to the light guiding system along an incidence light channel. The wavelength conversion section absorbs the first exciting light and emits excited light. The first exciting light is obliquely incident to a surface of the reflective section and reflected to form second exciting light. The light guiding system collects the excited light and the second exciting light and guides them to be emitted along an exiting light channel. The light guiding system includes an optical path correcting assembly, which reflects the second exciting light in such a manner that main optical axes of the (Continued)

reflected second exciting light and the excited light coincide, and changes a beam angular distribution of the second exciting light.

17 Claims, 8 Drawing Sheets

(56) References Cited

U.S. PATENT DOCUMENTS

| | | | |
|---|---|---|---|
| 2013/0322056 | A1 | 12/2013 | Konuma et al. |
| 2015/0362830 | A1 | 12/2015 | Liao et al. |
| 2016/0062220 | A1 | 3/2016 | Kato |
| 2016/0327851 | A1 | 11/2016 | Liao et al. |

FOREIGN PATENT DOCUMENTS

| | | | |
|---|---|---|---|
| CN | 101666960 | A | 3/2010 |
| CN | 101713908 | A | 5/2010 |
| CN | 103062672 | A | 4/2013 |
| CN | 103453448 | A | 12/2013 |
| CN | 103543589 | A | 1/2014 |
| CN | 103676434 | A | 3/2014 |
| CN | 104698729 | A | 6/2015 |
| CN | 104820334 | A | 8/2015 |
| CN | 104965384 | A | 10/2015 |
| CN | 105278226 | A | 1/2016 |
| CN | 105319819 | A | 2/2016 |
| CN | 106200233 | A | 12/2016 |
| CN | 106468427 | A | 3/2017 |
| CN | 206610072 | U | 11/2017 |
| CN | 206671745 | U | 11/2017 |
| CN | 107688272 | A | 2/2018 |
| JP | 2012-078488 | A | 4/2012 |
| JP | 2014142369 | A | 8/2014 |
| JP | 2015-090432 | A | 5/2015 |
| JP | 2015-111244 | A | 6/2015 |
| JP | 2016-024403 | A | 2/2016 |
| KR | 10-2012-0107297 | A | 10/2012 |
| TW | 201435470 | A | 9/2014 |
| WO | WO 2010/146683 | A1 | 12/2010 |
| WO | WO 2014/109333 | A1 | 7/2014 |
| WO | WO 2016/066374 | A1 | 5/2016 |

OTHER PUBLICATIONS

International Search Report of corresponding PCT Application No. PCT/CN2017/081311—4 pages (dated Dec. 20, 2017).

Chinese Search Report issued in application No. 201710150667.3 dated Jan. 25, 2019.

Chinese Office Action issued in application No. 201710150667.3 dated Feb. 19, 2019.

Chinese Search Report issued in application No. 201911068781.7 dated Apr. 9, 2019.

Chinese Office Action issued in application No. 201911068781.7 dated Apr. 16, 2021.

* cited by examiner

LIGHT SOURCE DEVICE AND PROJECTION SYSTEM

CROSS-REFERENCE TO RELATED APPLICATIONS

The present application is a national phase application of International Application No. PCT/CN2017/081311 filed on Apr. 20, 2017, which claims priority to Chinese Patent Application No. 201710150667.3, filed on Mar. 14, 2017, the contents of each of which are incorporated herein by reference in its entirety and made a part of this specification.

TECHNICAL FIELD

The present disclosure relates to the field of projection technology, and more particularly, to a light source device and a projection system.

BACKGROUND

In the field of projection technology, a semiconductor blue laser is used to excite phosphors to generate red light and green light, and it is a commonly used method to modulate an image by using blue light emitted by the semiconductor blue laser itself and the red light and the green light to form three primary colors.

In the related art, a blue laser is usually used to excite wavelength conversion materials to generate red fluorescence and green fluorescence, and then blue laser, the red fluorescence and the green fluorescence are combined by a dichroic color sheet. However, in such light-combining manner, the blue laser will have a loss in a blue light transmission region, such that a portion of a light beam incident to a light-homogenizing device located at a rear end of an optical path, corresponding to the blue light transmission region, lacks blue light, thereby resulting in an uneven color in a surface of a light spot at an exit of the light-homogenizing device.

SUMMARY

Specifically, the present disclosure provides a light source device, wherein the light source device includes a first light source, a light guiding system, and a wavelength conversion device; the first light source is configured to emit first exciting light, and the first exciting light is incident to the light guiding system along an incidence light channel; the light guiding system is configured to guide the first exciting light to the wavelength conversion device; the wavelength conversion device includes a wavelength conversion section and a reflective section, and periodically moves in such a manner that the wavelength conversion section and the reflective section are periodically located on an optical path of the first exciting light in time division, the wavelength conversion section absorbs the first exciting light and emits excited light, and the first exciting light is obliquely incident to a surface of the reflective section and is reflected to form second exciting light; the light guiding system is further configured to collect the excited light and the second exciting light and guide the excited light and the second exciting light to exit along an exiting light channel. The light guiding system includes an optical path correcting assembly, which is located on an optical path of the second exciting light and is configured to reflect the second exciting light in such a manner that a main optical axis of the reflected second exciting light coincides with a main optical axis of the excited light and further to change a beam angular distribution of the second exciting light in such a manner that imaging positions of the second exciting light and the excited light coincide in a direction of beam propagation.

Advantageous Effects

Compared with the related art, the present disclosure includes following beneficial effects. Through guiding of the light guiding system, the first exciting light is incident to the surface of the reflective section of the wavelength conversion device in an oblique incidence manner. The reflective section on the wavelength conversion device reflects rather than scatters the first exciting light to form the second exciting light, which avoids an expansion of an etendue of the second exciting light, such that the second exciting light after the reflection is separated from the optical path of the first exciting light and does not return on the original path along the optical path of the first exciting light, thereby avoiding that the second exciting light loses part of the light along the optical path of the first exciting light and thus effectively improving the light utilization rate. The position of the main optical axis of the second exciting light is corrected (changing the imaging position of the light spot of the second exciting light in a direction perpendicular to its optical path) by the reflection effect of the optical path correcting assembly of the light guiding system, and the imaging position of the second exciting light is corrected (changing the imaging position of the light spot of the second exciting light in the direction of the beam propagation such that the imaging positions, in the direction of the beam propagation, of the second exciting light and the excited light coincide) by changing the angular distribution of the second exciting light using the optical path correcting assembly, thereby making the second exciting light and the excited light have the same spatial distribution uniformity at a predetermined position. Therefore, the technical solution of the present disclosure improves the utilization rate of light and ensures the spatial distribution uniformity of the color of the light source.

DESCRIPTION OF EMBODIMENTS

In the present disclosure, descriptions involving "first", "second", "third" and the like are used for descriptive purposes only for convenience of description but should not be understood as indicating or implying their relative importance or implicitly indicating the number of technical features indicated. Thus, features defining "first", "second", and "third" may include at least one of the features, either explicitly or implicitly.

Figure 1A:
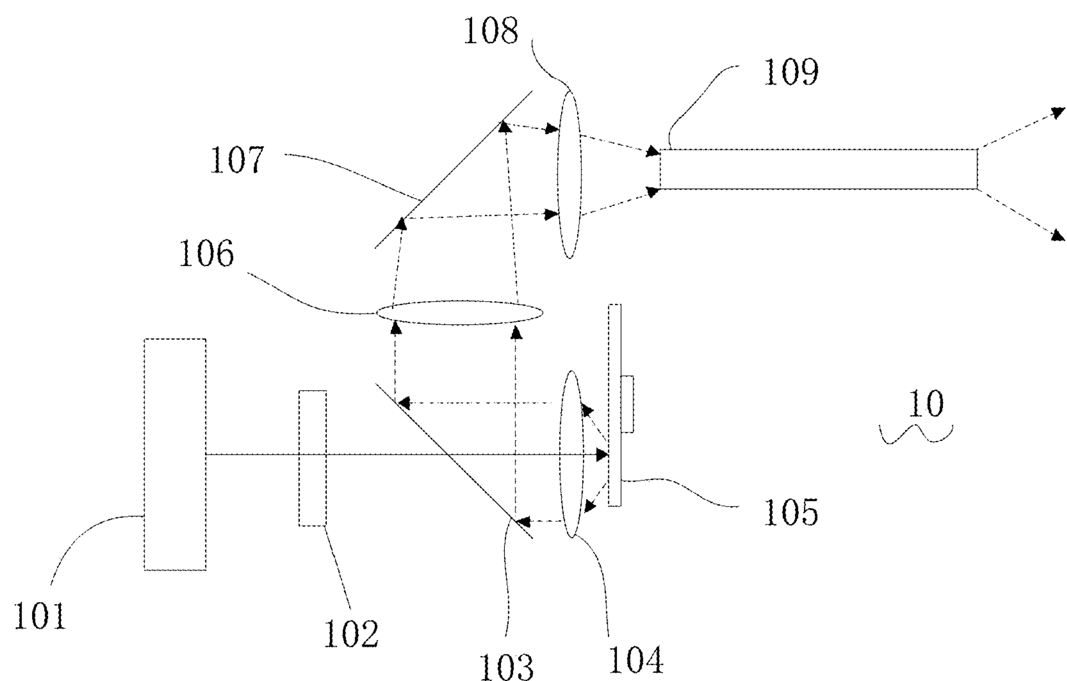
FIG. 1A is a structural schematic diagram of a light source device in the related art.

In the related art, as shown in FIG. 1A, the light source device 10 includes a first light source 101, a light homogenizing element 102, a region light splitter 103, a collecting lens 104, a phosphor color wheel 105, a first relay lens 106 and a second relay lens 108, a mirror 107 and a square bar 109.

Figure 1B:
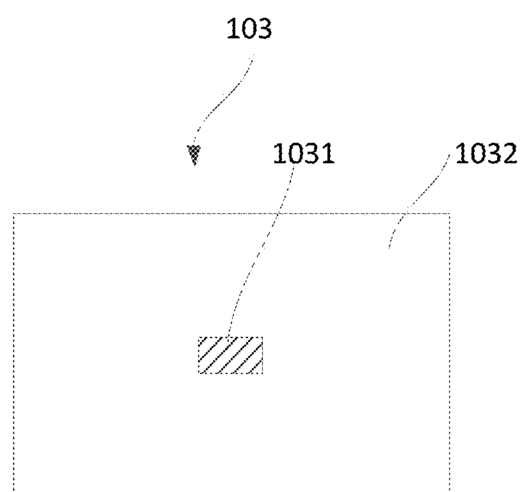
FIG. 1B is a structural schematic diagram of a region light splitter in the light source device in FIG. 1A.

As shown in FIG. 1B, the region light splitter 103 includes a blue-transmitting and yellow-reflective region 1031 and a blue-reflective and yellow-reflective region 1032. The blue-transmitting and yellow-reflective region 1031 is located in a central region of the region light splitter.

The first light source 101 is a blue laser, and blue light (exciting light) emitted thereby is homogenized by the light homogenizing element 102 and then incident to the region light splitter 103 and transmitted through the blue-transmitting and yellow-reflective region 1031 of the region light splitter 103. The blue light is incident to the collecting lens 104 along a central axis of the collecting lens 104, and the collecting lens 104 is used to converge the exciting light. The blue light is collected by the collecting lens 104 and then incident to the phosphor color wheel 105. The phosphor color wheel 105 includes a first section coated with a red phosphor, a second section coated with a green phosphor and a third section having a scattering and reflecting function. The phosphor color wheel 105 rotates periodically in such a manner that the first section, the second section, and the third section are located on an optical path of the blue light in time division. The blue light excites the red phosphor to generate a red fluorescence (excited light), the blue light excites the green phosphor to generate a green fluorescence (excited light), and the red fluorescence and the green fluorescence are emitted in a form of Lambert light. The blue light is scattered and reflected by the third section and is also emitted in the form of the Lambert light, and an etendue becomes large. The red fluorescence and the green fluorescence pass through the collecting lens 104 and are reflected by the region light splitter 103; while for the blue light emitted in the form of the Lambert light, only the blue-reflective and yellow-reflective region 1032 will reflect it, and the blue light incident to the blue-transmitting and yellow-reflective region 1031 will be lost due to transmission. The red light, the green light, and the blue light pass through the relay lens 106, the mirror 107, and the relay lens 108 to enter the square bar 109 and are finally emitted from an emission end of the square bar 109.

In view of the above, the technical solution in the related art not only loses part of the exciting light, thereby lowering brightness of the light source, but also results in poor color uniformity.

In view of the defects in the related art that a light utilization rate is not high enough and a color uniformity is poor, the present disclosure provides a light source device with a light utilization rate and good color uniformity of a light source.

A basic idea of the present disclosure lies in that after exciting light is reflected by a wavelength conversion device, there is no light returning along an original path of an incidence optical path of the exciting light, thereby avoiding loss of this part of the exciting light; moreover, since light distributions of excited light and the reflected exciting light are different, an imaging position of a light spot of the exciting light is changed by an action of a light guiding system, such that the excited light and the reflected exciting light are image-coincident at a predetermined position and have the same spatial distribution uniformity, thereby achieving color uniformization of the total emitted light.

In the present disclosure, a main optical axis of a beam can be understood as a central axis of the beam, and a direction of the main optical axis is a direction in which the beam advances.

The embodiments of the present disclosure will be described in detail below with reference to the accompanying drawings and embodiments.

Embodiment 1

Figure 2:
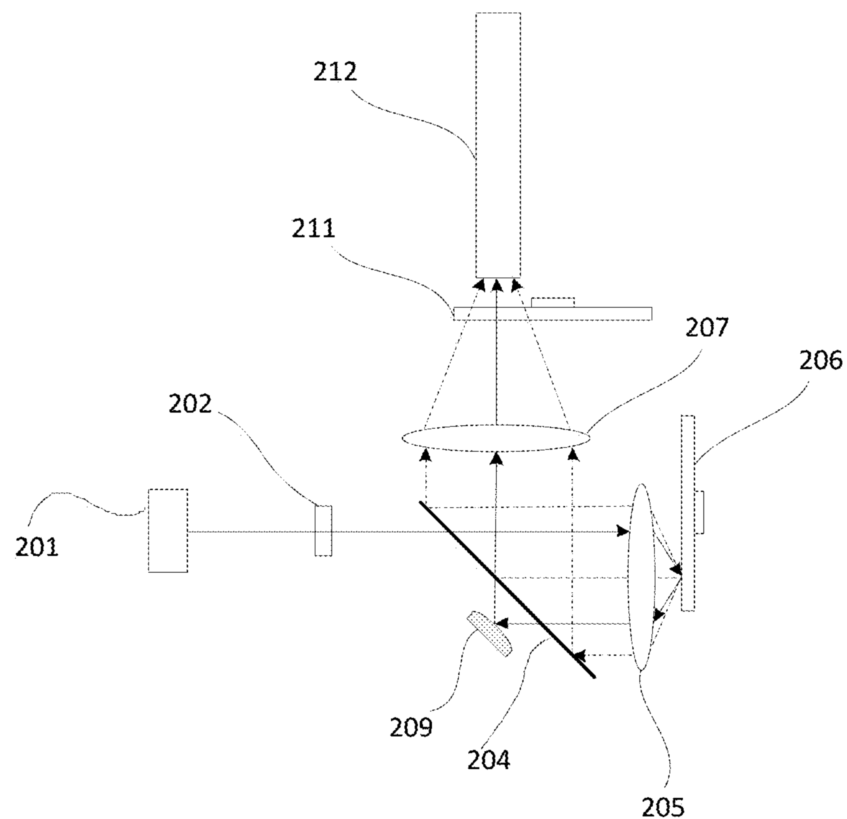
FIG. 2 is a structural schematic diagram of a light source device according to Embodiment 1 of the present disclosure.

Referring to FIG. 2, FIG. 2 is a structural schematic diagram of a light source device according to Embodiment 1 of the present disclosure. The light source device includes a first light source 201, a light guiding system, and a wavelength conversion device 206. The light guiding system includes a first light splitting assembly 204, a collecting lens 205, a relay lens 207, and an optical path correcting assembly 209. In addition, the light source device further includes a light homogenizing device 202, a filter wheel 211, and an integrator rod 212.

In this embodiment, the first light source 201 emits first exciting light, and the first exciting light is incident to the light guiding system along an incidence light channel. The light guiding system guides the first exciting light to the wavelength conversion device 206. Specifically, the first exciting light is homogenized by the light homogenizing device 202, and then it is incident to a first region of the first light splitting assembly 204 and transmitted through the first light splitting assembly 204. Then, it is incident to the collecting lens 205, and it is collected by the collecting lens 205 and then transferred to the wavelength conversion device 206. Moreover, the first exciting light is incident to a surface of the wavelength conversion device 206 in such a manner that a main optical axis is incident obliquely (i.e., not incident perpendicularly).

The wavelength conversion device 206 includes a wavelength conversion section and a reflective section. The wavelength conversion device 206 periodically moves in such a manner that the reflective section and the wavelength conversion section are periodically located on an optical path of the first exciting light in time division. The wavelength conversion section absorbs the first exciting light and emits excited light. The reflective section reflects the first exciting light to form second exciting light. The wavelength conversion section includes a wavelength conversion material or a wavelength conversion structure and can absorb the exciting light and emit excited light having a wavelength different from that of the exciting light. Under an action of the wavelength conversion section, the excited light is substantially in a Lambert distribution, and a direction of a main optical axis is perpendicular to the wavelength conversion section, while the reflective section does not change an angular distribution of the exciting light. The angular distributions of the first exciting light and the second exciting light are substantially the same, and the second exciting light is symmetrically emitted with respect to the first exciting light, and an emission direction is not perpendicular to the reflective section. Therefore, the main optical axes of the excited light and the second exciting light do not coincide, and the excited light and the second exciting light propagate along two different optical paths.

The light guiding system is further used to collect the excited light and the second exciting light and guide the excited light and the second exciting light to be emitted along an exiting light channel, which will be described as follows.

When the wavelength conversion section of the wavelength conversion device 206 is on the optical path of the first exciting light, the excited light, after being emitted by the wavelength conversion section, is collected by the collecting lens 205 and transferred to the first light splitting assembly 204. The first light splitting assembly 204 has opposite transmission-reflection characteristics for the first exciting light and the excited light such that the excited light is reflected and guided to exit along the exiting optical path.

When the reflective section of the wavelength conversion device 206 is on the optical path of the first exciting light, the second exciting light, after being emitted by the reflective section, is collected by the collecting lens 205 and transferred to a second region of the first light splitting assembly 204. The second exciting light has the same wavelength as that of the first exciting light. The second exciting light is transmitted through the second region of the first light splitting assembly 204 and transferred to the optical path correcting assembly 209. In this embodiment, the regions of the first light splitting assembly 204, on which the first exciting light and the second exciting light are incident, do not overlap (the first region does not overlap with the second region), so the second exciting light does not return to the first light source 201 in a reverse direction on the original path along the incidence optical path of the first exciting light. The optical path correcting assembly 209 is located on an optical path of the second exciting light. The second exciting light incident to the optical path correcting assembly 209 is reflected by a reflective surface of the optical path correcting assembly 209, such that the main optical axis of the reflected second exciting light coincides with the main optical axis of the excited light. The reflected second exciting light is again transmitted through the first light splitting assembly 204, combined with the excited light into one beam (which means a coincidence of the optical paths of the two, and actually, the two are staggered in time) at a position of the first light splitting assembly 204 where the excited light is emitted, and converged by the relay lens 207 so as to be incident to the filter wheel 211, and the light transmitted through the filter wheel 211 enters the integrator rod 212 from an inlet of the integrator rod 212.

In the present disclosure, the "coincidence" of the main optical axis of the second exciting light and the main optical axis of the excited light can be understood as an approximate coincidence/a coincidence within a precision error range instead of a coincidence in an absolute sense. Those skilled in the art can understand that, based on the technical solutions provided by the present disclosure, a technical solution in which the main optical axis of the second exciting light and the main optical axis of the excited light are parallel and an interval is smaller than a threshold is also within the protection scope of the present disclosure, and such technical solution may also be referred to as "a coincidence within the error range".

The above is a basic technical solution of Embodiment 1 of the present disclosure. On the basis of the above, a variety of specific technical solutions can be derived from the respective assemblies of the light source device of the present disclosure based on the actual application environment, and the various technical solutions can be combined with each other, which will be exemplified by following examples.

In one embodiment, the first light source 201 can be a blue laser or an array of blue lasers. The first exciting light is blue laser having a small divergence angle, a converged beam and a substantial Gaussian distribution, such that the optical path of the reflected second exciting light can be easily distinguished from that of the first exciting light. In another embodiment, the first light source 201 can be a LED emitting blue light and the first exciting light is blue LED light. The present disclosure is not limited thereto, but it is preferable that the first exciting light has a small divergence angle.

In one embodiment, the light homogenizing device 202 includes an integrator rod or a fly-eye lens pair for homogenizing the first exciting light emitted by the first light source 201. In other embodiments, if the uniformity of the first exciting light emitted by the first light source 201 is good, the light homogenizing device may not be provided, which is not limited in the present disclosure. Without doubt, in an embodiment of the present disclosure, the combination of the first light source 201 and the light homogenizing device 202 in Embodiment 1 can also be regarded as one first light source.

In this embodiment, the wavelength conversion device 206 is a wheel-disk structure (a fluorescent color wheel). The wavelength conversion section and the reflective section are arranged in a fan shape on the wheel-disk structure and driven by a driving device (such as a motor) to rotate around a central axis of the wheel-disk. In another embodiment, the wavelength conversion device may also be a fluorescent color barrel/color cylinder and includes a wavelength conversion section and a reflective section which are distributed around a barrel/cylinder surface. The color barrel/color cylinder rotates around its axis direction so that different sections are periodically illuminated by the exciting light in a time sequence. Alternatively, the wavelength conversion device may be a fluorescent color plate and includes a wavelength conversion section and a reflective section which are sequentially arranged in a straight-line direction. The color plate linearly vibrates in the straight-line direction, such that the different sections are periodically illuminated by the exciting light in a time sequence, so as to emit sequential light.

In one embodiment, the wavelength conversion section of the wavelength conversion device 206 includes a fluorescent material layer. The fluorescent material layer may be a phosphor-organic adhesive layer (separate phosphors are bonded into a layer by an organic adhesive such as silica gel or epoxy resin) or a phosphor-inorganic adhesive layer (separate phosphors are bonded into a layer by an inorganic adhesive such as glass), and it may also be fluorescent ceramics (including 1) a structure in which a continuous ceramic is used as a substrate and phosphor particles are distributed in the ceramic; 2) a pure phase ceramic doped with an activator element, such as YAG ceramics doped with Ce; and 3) on the basis of the pure phase ceramic doped with an activator element, the phosphor particles are dispersed in the ceramic). In another embodiment, the wavelength conversion section includes a quantum dot layer and plays a photoluminescence role by a quantum dot material. The wavelength conversion device 206 can have only one wavelength conversion section (such as a yellow wavelength conversion section) or have only two wavelength conversion sections (such as a green wavelength conversion section and a red wavelength conversion section), and it may also include more than two wavelength conversion sections.

In one embodiment, the reflective section of the wavelength conversion device 206 includes a metal reflective surface that specular-reflects the exciting light. In another embodiment, the reflective section includes a dielectric reflective film and specular-reflects the exciting light. In other embodiments of the present disclosure, the reflective sections may also employ other reflective structures to reflect the exciting light.

In the present embodiment, the reflective surface of the reflective section of the wavelength conversion device 206 is parallel with a motion plane of the wavelength conversion device 206. That is, the rotation axis of the fluorescent color wheel is perpendicular to the reflective surface of the reflective section. In order to achieve that the first exciting light is incident to the surface of the wavelength conversion device in an oblique incidence manner (when the reflective section is located on the optical path of the first exciting light, the reflective surface of the reflective section is the surface of the wavelength conversion device), the first exciting light is incident to the collecting lens 205 at a position deviating from the center of the collecting lens 205, such that the first exciting light has a light transferring direction changed by the collecting lens 205, and thus it is obliquely incident to the surface of the wavelength conversion device. Subsequently, the second exciting light reflected from the reflective section is incident to the collecting lens 205. Between the collecting lens 205 and the wavelength conversion device 206, the first exciting light and the second exciting light form a "V"-shaped optical path. In another embodiment, the reflective surface of the reflective section may also be not parallel with the motion plane of the wavelength conversion device but has an inclination angle relative to the motion plane of the wavelength conversion device. However, it is still necessary to ensure that the first exciting light is incident to the reflective surface of the reflective section in an obliquely incident manner, thereby achieving separation of the optical paths of the first exciting light and the second exciting light, and this technical solution can make the optical path design more flexible and changeable.

In this embodiment, the first light splitting assembly 204 is a filter sheet/filter film/dichroic color film that transmits the exciting light (including the first exciting light and the second exciting light) and reflects the excited light. The first light splitting assembly 204 is sufficiently large in such a manner that the light from the collecting lens 205 can be reflected towards the relay lens 207 and the sufficiently large first and second regions that are separated from each other can be used for the transmission of the first exciting light and the second exciting light, respectively.

In this embodiment, the optical path correcting assembly 209 includes a convex reflective surface. The convex reflective surface faces the second exciting light, reflects the second exciting light, and changes the angular distribution of the beam to diverge the beam. The optical path correcting assembly 209 is disposed on a side of the first light splitting assembly 204 facing away from the wavelength conversion device 206.

In the present disclosure, in addition to enabling the main optical axis of the second exciting light to be coincident with the main optical axis of the excited light by reflecting, the optical path correcting assembly has a function of converging or diverging the beam by varying the angular distribution of the beam of the second exciting light. A process of the light from the wavelength conversion device 206 to the inlet of the integrator rod 212 is actually a process from the light spot-imaging on the surface of the wavelength conversion device 206 to the incidence surface of the integrator rod 212 (the integrator rod can also be replaced with other optical elements; moreover, the light spot on the surface of the wavelength conversion device is imaged to an incidence surface of the replaced optical element). Since the optical paths of the second exciting light and the excited light are different and the optical-distances of the two are different before their main optical axes coincide, their imaging positions do not coincide under the action of passing the same optical element after the coincidence of their optical paths, which results in poor spatial uniformity of one of the second exciting light and the excited light (because the light spot on the wavelength conversion device as "an object" is uniform, while the light spot whose imaging position deviates from the integrator rod 212 is in an out-of-focus state on the incidence surface of the integrator rod 212, the surface distribution of the light spot is necessarily uneven). By adding the curved reflective surface, the second exciting light is converged or diverged once again, so that the imaging position of the second exciting light can be made coincident with the imaging position of the excited light.

In this embodiment, the optical path correcting assembly 209 is disposed on a side of the first light splitting assembly 204 facing away from the wavelength conversion device 206. The second exciting light from the optical path correcting assembly 209 passes through the first light splitting assembly 204 and then coincides with the main optical axis of the excited light. Relative to the excited light, an optical-distance of the second exciting light from the wavelength conversion device 206 to a coincidence position (here, it still refers to the coincidence of the spatial positions of the second exciting light and the excited light, and actually the second exciting light and the excited light are staggered in time) of the second exciting light and the excited light is larger than an optical-distance of the excited light, and an optical-distance of the second exciting light from the wavelength conversion device 206 to an incidence surface of the integrator rod 212 is larger than an optical-distance of the excited light from the wavelength conversion device 206 to the incidence surface of the integrator rod 212. Considering an optical element between the wavelength conversion device and the integrator rod as an imaging device and according to an imaging formula of $1/u+1/v=1/f$, if it is required to make imaging positions of the second exciting light and the excited light the same, then it is necessary to increase a focal length $f$ of the imaging device of the second exciting light, and this function can be achieved by adding a concave lens or a convex lens on the optical path of the second exciting light. The optical path correcting assembly 209 in the present embodiment includes a convex reflective surface, which increases an imaging focal length of the second exciting light from the wavelength conversion device to the integrator rod and thus enables the second exciting light and the excited light to be imaged at the same position, thereby achieving the spatial distribution uniformity of the emitted light of the light source device.

In one embodiment, the convex reflective surface of the optical path correcting assembly 209 is a structure in which a metal reflective film is plated on a convex structure. In other embodiments, it may also be achieved by plating a dielectric reflective film or the like.

In one embodiment, the collecting lens 205 can be formed by a combination of a plurality of lenses.

In one embodiment, the relay lens 207 can be formed by a combination of a plurality of lenses, such as a combination of concave lenses and convex lenses, and the like. It will be understood that the relay lens is not a requisite assembly of the light source device of the present disclosure.

In the present embodiment, the filter wheel 211 includes a scattering-transmitting section and a color-retouching transmitting section. The scattering-transmitting section is for scattering the second exciting light, to make the divergence angle of the second exciting light coincide with the divergence angle of the excited light. The scattering-transmitting section can be implemented by providing a scattering sheet. The color-retouching transmitting section is used to perform color retouching on the excited light in such a manner that a color coordinate of the transmitted excited light conforms to requirements on the emitted light of the light source device. The color-retouching transmitting section can be implemented by providing a wavelength filter. The filter wheel 211 is driven by a driving device (such as a motor) to periodically rotate, so that the filter wheel 211 is synchronized with the wavelength conversion device 206, to make respective sections of the filter wheel 211 be in one-to-one correspondence with respective sections of the wavelength conversion device 206. Specifically, when the wavelength conversion device 206 emits the excited light, the color-retouching transmitting section of the filter wheel 211 is located on the optical path of the excited light; and when the wavelength conversion device 206 emits the second exciting light, the scattering-transmitting section of the filter wheel 211 is located on the optical path of the second exciting light. Since after the exciting light is scattered by a general scattering sheet, the angular distribution of the exciting light is of Gaussian scattering, which is different from the angular distribution of the excited light. Therefore, in order to make the angular distribution of the exciting light that has been scattered be consistent with that of the excited light, in some embodiments, the scattering-transmitting section is provided with a Top-hat type scattering sheet (that is, the angular distribution after scattering is approximately in a "几" shape and appears like a top hat, so that it is called a top-hat) or a single-row fly-eye structure arranged in a hexagon.

It can be understood that the filter wheel is not an essential assembly of the light source device of the present disclosure, so in the case where requirements on the color coordinate or the angular distribution of the emitted light is relatively low, the filter wheel may be omitted, which is not limited in the present disclosure.

In the present embodiment, the light emitted from the filter wheel 211 enters the integrator rod 212 and is homogenized. In other embodiments, the integrator rod 212 can also be replaced with other homogenizing elements. In other embodiments, the integrator rod 212 may also be omitted so that the emitted light directly enters the subsequent optical element, which is not limited in the present disclosure.

Embodiment 2

Figure 3:
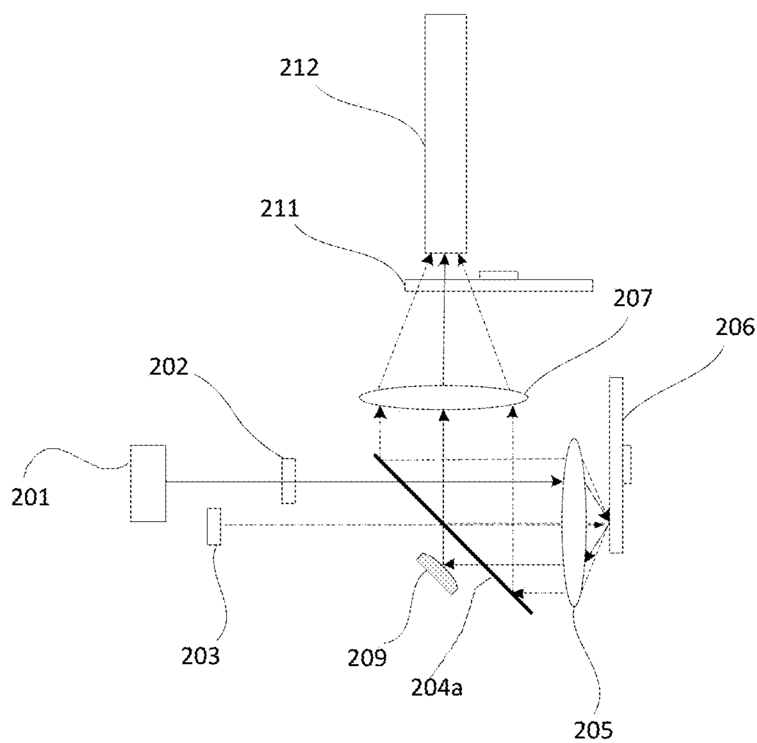
FIG. 3 is a structural schematic diagram of a light source device according to Embodiment 2 of the present disclosure.

Referring to FIG. 3, FIG. 3 is a structural schematic diagram of a light source device according to Embodiment 2 of the present disclosure. The light source device includes a first light source 201, a light guiding system, and a wavelength conversion device 206. The light guiding system includes a first light splitting assembly 204*a*, a collecting lens 205, a relay lens 207 and an optical path correcting assembly 209. Further, the light source device further includes a second light source 203, a light homogenizing device 202, a filter wheel 211, and an integrator rod 212.

For descriptions of the first light source 201, the light guiding system, the wavelength conversion device 206, the light homogenizing device 202, the filter wheel 211, and the integrator rod 212, reference may be made to the description in Embodiment 1.

Compared with Embodiment 1, a second light source 203 is added in the technical solution of Embodiment 2, and it is used for emitting compensation light when the wavelength conversion section of the wavelength conversion device 206 is on the optical path of the first exciting light. Furthermore, compared with Embodiment 1, the first light splitting assembly 204*a* further includes a compensation light guiding region capable of guiding the compensation light to the wavelength conversion device.

When the compensation light is incident to the first light splitting assembly 204*a*, the compensation light is transmitted through the compensation light guiding region and converged by the collecting lens 205 to be incident to the wavelength conversion device 206. The compensation light will not be absorbed by the wavelength conversion device 206, but become light having a substantial Lambert distribution after being scattered and reflected (diffusely reflected), so as to be emitted together with the excited light. Except that a small amount of the compensation light and a portion of the excited light having overlapping spectrum with the compensation light are transmitted through the compensation light guiding region of the first light splitting assembly 204*a* and lost, the remaining compensation light and most of the excited light which is collected by the collecting lens 205 enter the exiting optical channel along the same optical path, so as to exit.

In one embodiment, the compensation light has a wavelength range that overlaps with that of the excited light. For example, the wavelength range of the compensation light is (a, b), and the wavelength range of the excited light is (c, d), where $c<a<d$. In one embodiment, a color of the compensation light may be the same or similar to that of the excited light. The compensation light can be used to compensate for at least one of hue, brightness and the like of the excited light. For example, in a specific embodiment, the second light source 203 is a red laser light source, and the wavelength conversion device 206 includes a reflective section, a green wavelength conversion section, and a red wavelength conversion section. When the red wavelength conversion section is on the optical path of the first exciting light, the second light source 203 is turned on, so that the red laser and the red excited light are emitted together, thereby achieving that the red light emitted from the light source device is closer to the required red color while increasing the brightness of the red light.

In the present embodiment, the compensation light may cause unevenness in the surface distribution of the color of the light spot due to the light loss in the compensation light guiding region, but since the colors of the excited light and the compensation light overlap, the compensation light only occupies a part of the color light, so the color uniformity is acceptable. Moreover, the setting of the compensation light guiding region does not affect the uniformity of the exciting light, and the present technical solution does not adversely affect the improvement of the uniformity of the exciting light.

In this embodiment, the compensation light guiding region is disposed on the main optical axis path of the excited light, and the compensation light guiding region is capable of transmitting the exciting light, such that the main optical axis of the second exciting light, which has been reflected by the optical path correcting assembly 209, can coincide with the main optical axis of the excited light through the compensation light guiding region.

In one embodiment, the compensation light guiding region is offset from the main optical axis of the excited light. That is, the compensation light is obliquely incident to the surface of the wavelength conversion device as the first exciting light. However, since the compensation light is incident to the wavelength conversion section of the wavelength conversion device, the scattered and reflected light becomes light having a substantial Lambert distribution, such that it can still coincide with the excited light instead of forming a "V"-shaped optical path. In this technical solution, the second exciting light reflected by the optical path correcting assembly may coincide with the main optical axis of the excited light without passing the compensation light guiding region. Therefore, the compensation light guiding region does not have to transmit the exciting light.

In other embodiments of the present disclosure (including but not limited to the following various embodiments), if it is not necessary to compensate for the excited light, the second light source 203 for emitting the compensation light may also be omitted. The present disclosure is not limited thereto. If the second light source 203 for emitting the compensation light is omitted, the first light splitting assembly may not include the compensation light guiding region.

Embodiment 3

Figure 4:
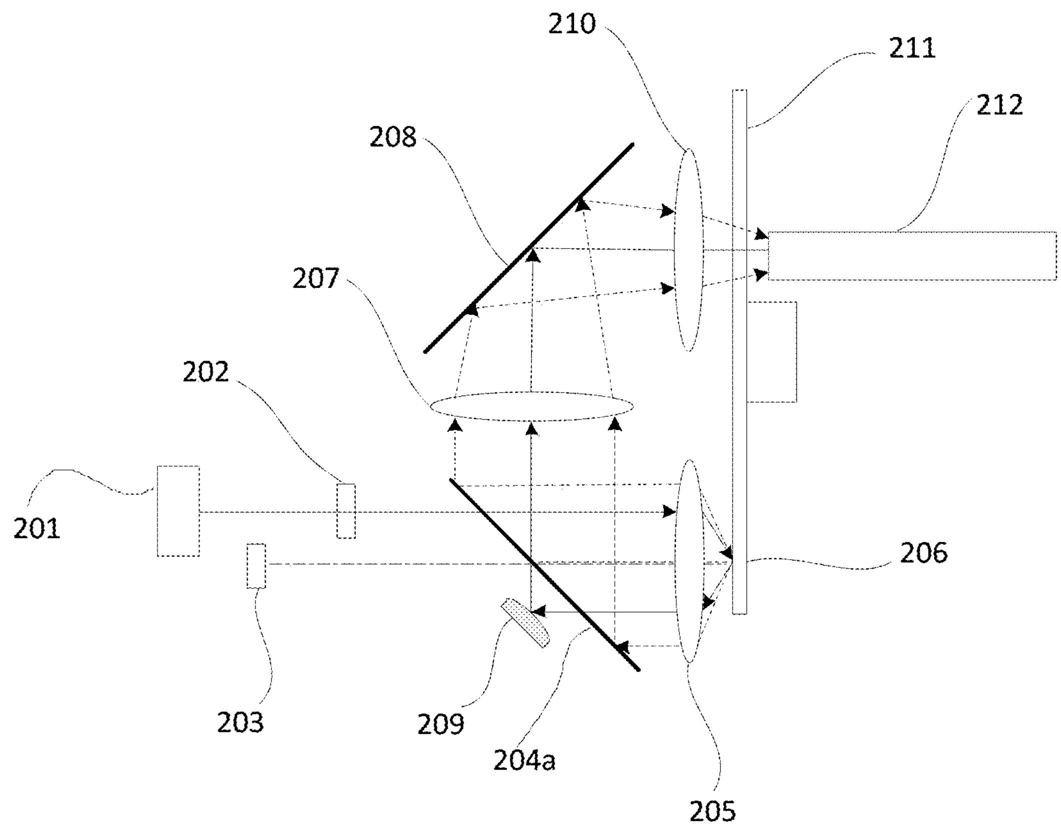
FIG. 4 is a structural schematic diagram of a light source device according to an Embodiment 3 of the present disclosure.

Referring to FIG. 4, FIG. 4 is a structural schematic diagram of a light source device according to Embodiment 3 of the present disclosure. The light source device includes a first light source 201, a light guiding system, and a wavelength conversion device 206. The light guiding system includes a first light splitting assembly 204*a*, a collecting lens 205, a first relay lens 207, a reflective sheet 208, an optical path correcting assembly 209, and a second relay lens 210. Further, the light source device further includes a second light source 203, a light homogenizing device 202, a filter wheel 211, and an integrator rod 212.

In each of the above embodiments, the wavelength conversion device 206 and the filter wheel 211 are disposed independently of each other and are respectively driven by two driving devices to move periodically. In contrast, in the present embodiment, the wavelength conversion device 206 is disposed coaxially with the filter wheel 211, and they are rotated about the same axis under driving of one driving device.

Figure 4A:
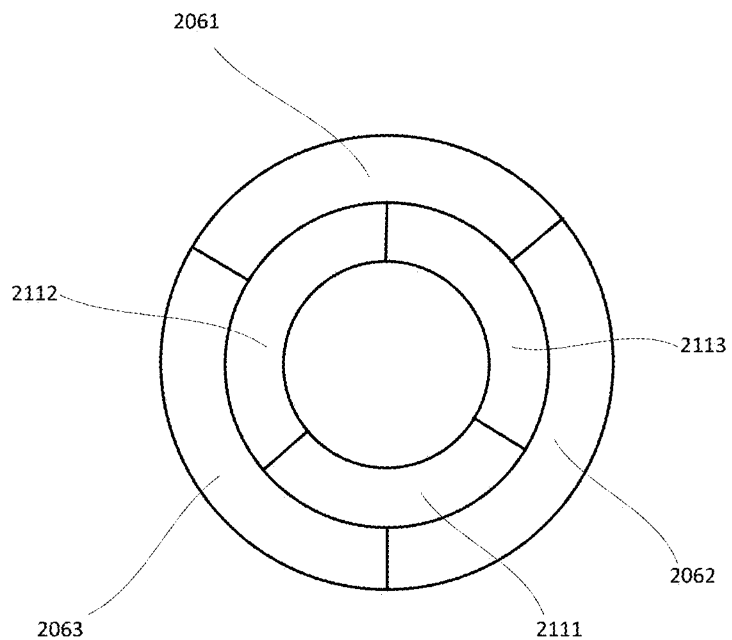
FIG. 4A is a structural schematic diagram of a wavelength conversion device in FIG. 4.

As shown in FIG. 4A, the wavelength conversion device 206 includes a fan-ring-shaped reflective section 2061, a red wavelength conversion section 2062, and a green wavelength conversion section 2063. The filter wheel 211 includes a fan-ring-shaped scattering-transmitting section 2111, a red color-retouching transmitting section 2112, and a green color-retouching transmitting section 2113. A fan-ring angle of the reflective section 2061 is the same as a fan-ring angle of the scattering-transmitting section 2111. A fan-ring angle of the red wavelength conversion section 2062 is the same as a fan-ring angle of the red color-retouching transmitting section 2112. A fan-ring angle of the green wavelength conversion section 2063 is the same as a fan-ring angle of the green color-retouching transmitting section 2113. In this embodiment, the reflective region 2061 is disposed at 180° opposite to the scattering-transmitting region 2111, and this technical solution makes the reflective region 2061 be farthest from the scattering-transmitting region 2111, so that there is sufficient space to arrange optical elements of an intermediate optical path. Without doubt, in other embodiments, the reflective region and the scattering-transmitting region may be disposed at an arbitrary angle of 0 to 180°, which is not limited in the present disclosure.

As structural positions of the wavelength conversion device 206 and the filter wheel 211 change, the optical path between the wavelength conversion device 206 and the filter wheel 211 is also appropriately adjusted. With respect to the above embodiments, the present embodiment adds a reflective sheet 208 and a second relay lens 210, for guiding the excited light, the second exciting light and the compensation light. The reflective element 208 reflects the excited light, the second exciting light and the compensation light from the first relay lens 207 to the second relay lens 210, and the second relay lens 210 collects and transfers the excited light, the second exciting light and the compensation light to the filter wheel 211.

In one embodiment, the reflective element 208 is a metal mirror. In another embodiment, the reflective element 208 can also be an element that includes a dielectric reflective film. In other embodiments, the reflective element 208 can also be other types of reflective optical elements, which is not limited in the present disclosure.

In another embodiment of the present disclosure, in the case where the reflective element 208 and the second relay lens 210 are retained, it is also possible to split the wavelength conversion device 206 and the filter wheel 211 into two relatively independently arranged elements without changing their positions, and this technical solution is also within the scope of the present disclosure.

For other respective assemblies in this embodiment, reference may be made to the description of Embodiment 2 and its modified embodiments, and details will not be described herein again.

The variation of the present embodiment based on Embodiment 2 can also be applied to Embodiment 1, and details will not be described herein again.

Embodiment 4

Figure 5:
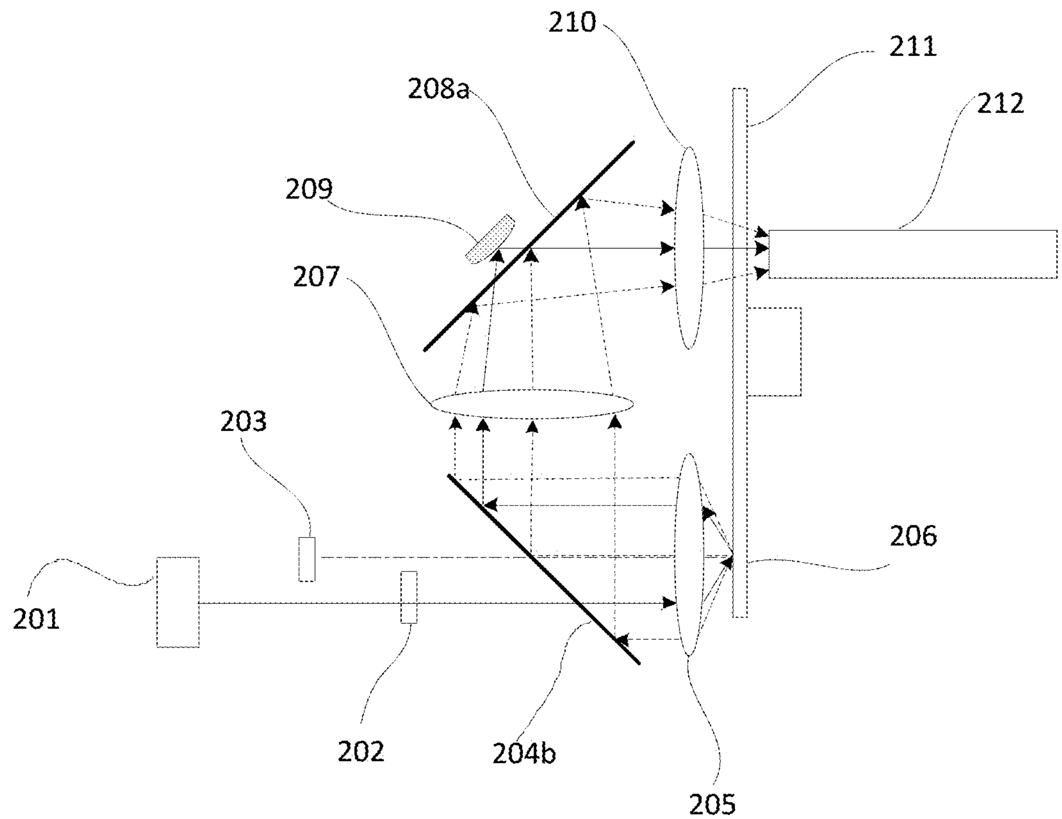
FIG. 5 is a structural schematic diagram of a light source device according to Embodiment 4 of the present disclosure.

Referring to FIG. 5, FIG. 5 is a structural schematic diagram of a light source device according to Embodiment 4 of the present disclosure. The light source device includes a first light source 201, a light guiding system, and a wavelength conversion device 206. The light guiding system includes a first light splitting assembly 204*b*, a collecting lens 205, a first relay lens 207, a second light splitting assembly 208*a*, an optical path correcting assembly 209, and a second relay lens 210. Further, the light source device further includes a second light source 203, a light homogenizing device 202, a filter wheel 211, and an integrator rod 212.

In each of the above embodiments, the first and second regions of the first light splitting assembly 204 or the first light splitting assembly 204*a* have the same transmission and reflection characteristics on the first exciting light and the second exciting light. In contrast, in this embodiment, the transmission and reflection characteristics of the first region on the first exciting light and the transmission and reflection characteristics of the second region on the second exciting light are opposite.

Figure 5A:
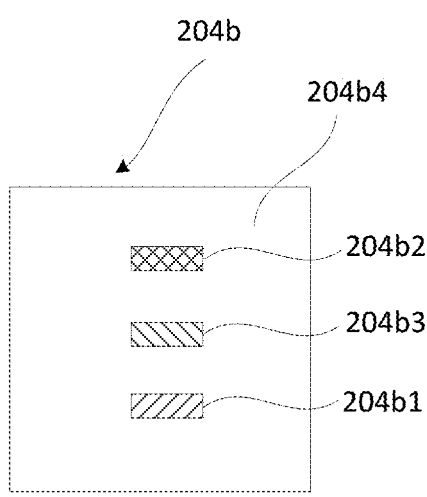
FIG. 5A is a structural schematic diagram of a first light splitting assembly in FIG. 5.

As shown in FIG. 5A, the first light splitting assembly 204*b* includes a first region 204*b*1, a second region 204*b*2, a compensation light guiding region 204*b*3 and a fourth region 204*b*4, and the first region and the second region do not overlap. The first region 204*b*1 transmits the first exciting light (further, reflects the excited light and the compensation light). The second region 204*b*2 reflects the second exciting light (further, reflects the excited light and the compensation light). The compensation light guiding region 204*b*3 transmits the compensation light (further, reflects light having a spectrum different from that of the compensation light). The fourth region 204*b*4 reflects the excited light and the compensation light. In one embodiment, region 204*b*4 transmits the exciting light, and first region 204*b*1 and region 204*b*4 may merge into one entire region. In another embodiment, the region 204*b*4 reflects the exciting light, and the second region 204*b*2 and the region 204*b*4 may merge into one entire region. The transmission and reflection characteristics of the respective regions can be achieved by plating. Further, the transmission can also be achieved by hollowing out, and the reflection can also be achieved by providing a reflective layer.

In this embodiment, the first light source 201 emits the first exciting light. After the first exciting light is homogenized by the light homogenizing device 202, it is incident to the first region 204*b*1 of the first light splitting assembly 204*b* and transmitted. After that, the first exciting light is converged by the collecting lens 205 and then transferred to the wavelength conversion device 206. When the wavelength conversion section of the wavelength conversion device 206 is on the optical path of the first exciting light, the wavelength conversion section absorbs the first exciting light and emits excited light having a substantial Lambert distribution. The excited light is collected by the collecting lens 205 and transferred to the first light splitting assembly 204*b*. The excited light covers most of the region of the first light splitting assembly 204. Except that a small amount of the excited light having a spectrum overlapping with that of the compensation light is transmitted through the compensation light guiding region 204*b*3 and lost, the remaining excited light is reflected to the first relay lens 207. When the reflective section of the wavelength conversion device 206 is on the optical path of the first exciting light, the first exciting light is obliquely incident to the surface of the reflective section and reflected by the reflective section to form second exciting light. The second exciting light and the first exciting light are in a "V"-shaped optical path and collected by the collecting lens 205 and transferred to the second region 204*b*2 of the first light splitting assembly 204*b*. The second exciting light is reflected by the second region 204*b*2 and is reflected to the first relay lens 207. The second light source 203 emits the compensation light. The compensation light is transmitted through the compensation light guiding region 204*b*3 of the first light splitting assembly 204*b*, and after being converged by the collecting lens 205, it is transferred to the wavelength conversion section of the wavelength conversion device 206. After being scattered and reflected by the wavelength conversion section, it becomes compensation light having a substantial Lambert distribution. After the compensation light is collected by the collecting lens 205, except that a small amount of the light is again transmitted through the compensation light guiding region 204*b*3 of the first light splitting assembly 204*b* and lost, the rest is emitted along the same optical path with the excited light.

In various beams reaching the first relay lens 207, in one aspect, the second exciting light is collected by the first relay lens 207 and transferred to the optical path correcting element 209, and it is reflected by the optical path correcting element 209 to the second relay lens 210 and transferred to the filter wheel 211 after being collected by the second relay lens 210. In this process, the second light splitting assembly 208*a* is disposed on the optical path between the first relay lens 207 and the optical path correcting element 209, and the second light splitting assembly 208*a* does not affect the transferring of the second exciting light, such that the second exciting light is directly transmitted. In another aspect, the excited light and the compensation light are collected by the first relay lens 207 and transferred to the second light splitting assembly 208*a*, and the second light splitting assembly 208*a* further reflects the excited light and the compensation light to the second relay lens 210. The second relay lens 210 collects and transfers the excited light and the compensation light to the filter wheel 211.

The optical path correcting element 209 is located on a reverse extension line of the optical path of the excited light reflected by the second light splitting assembly 208*a*. The optical path correcting element 209 reflects the second exciting light in such a manner that the main optical axis of the reflected second exciting light coincides with the main optical axis of the excited light, thereby achieving a uniform spatial distribution of the color on the incidence surface of the integrator rod 212.

In the present embodiment, the second exciting light passes through the second light splitting assembly 208*a* twice and coincides with the optical path of the excited light at the excited light emission position of the second light splitting assembly 208*a*. Relative to the excited light, the optical-distance of the second exciting light from the wavelength conversion device 206 to the coincidence position of the two beams is larger than the optical-distance of the excited light, so the optical path correcting assembly 209 also includes a convex reflective surface to increase the imaging focal length of the second excited light. This technical feature is similar to the various embodiments above in that all of them select a convex reflective surface to solve a problem of an uneven color distribution caused by the optical-distance of the second exciting light from the wavelength conversion device to a light-combining position of the second exciting light and the excited light being larger than the optical-distance of the excited light.

In Embodiment 1 to Embodiment 3, the first light splitting assembly 204 or 204*a* functions to distinguish between the optical paths of the first exciting light and the excited light and also plays a role in combining the optical paths of the second exciting light and the excited light. While in the present embodiment, the first light splitting assembly 204*b* achieves the distinguishing between the optical paths of the first exciting light and the excited light, and the second light splitting assembly 208*a* achieves the combining of the optical paths of the second exciting light and the excited light.

In one embodiment, if it is not necessary to compensate for the excited light, the second light source 203 may be omitted, and the compensation light guiding region of the first light splitting assembly may also be omitted.

For the optical processing on the beam performed by various optical elements, the beam transferring process and the like, which are not described in this embodiment, reference may be made to the description in above embodiments, and details will not be described herein again.

Embodiment 5

Figure 6:
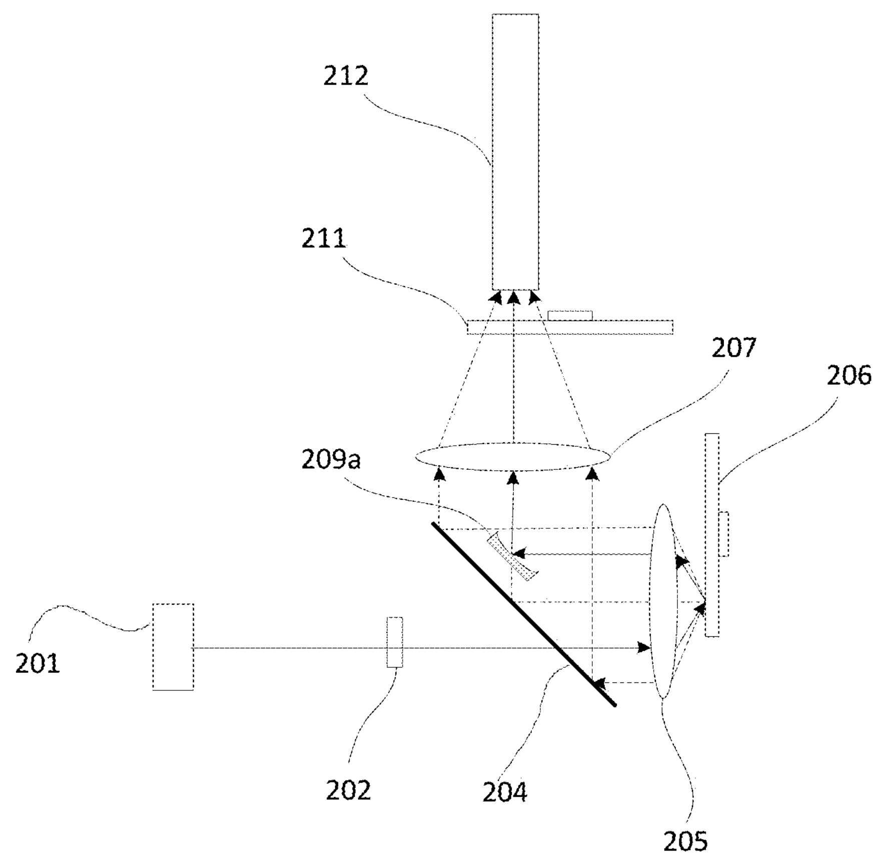
FIG. 6 is a structural schematic diagram of a light source device according to Embodiment 5 of the present disclosure.

Referring to FIG. 6, FIG. 6 is a structural schematic diagram of a light source device according to Embodiment 5 of the present disclosure. The light source device includes a first light source 201, a light guiding system, and a wavelength conversion device 206. The light guiding system includes a first light splitting assembly 204, a collecting lens 205, a relay lens 207 and an optical path correcting assembly 209*a*. In addition, the light source device further includes a light homogenizing device 202, a filter wheel 211, and an integrator rod 212.

The difference from Embodiment 1 is that, in this embodiment, the optical path correcting assembly 209*a* is an optical element including a concave reflective surface, and it is disposed on the side of the first light splitting assembly 204 close to the wavelength conversion device 206. Moreover, the second exciting light emitted from the reflective section of the wavelength conversion device 206 is not incident to the first light splitting assembly 204, but directly reflected by the concave reflective surface of the optical path correcting assembly 209*a*. Moreover, the optical path correcting assembly 209*a* is capable of transmitting the excited light, and it can be achieved by plating a filter film, which transmits the exciting light and reflects the second exciting light, on a concave surface of a transparent medium.

Specifically, the first light source 201 emits the first exciting light. It is incident to the first region of the first light splitting assembly 204 after being homogenized by the light homogenizing device 202, and it is transmitted through the first light splitting assembly 204 and then incident to the collecting lens 205. After being converged by the collecting lens 205, it is transferred to the wavelength conversion device 206. When the first exciting light is incident to the wavelength conversion section of the wavelength conversion device 206, the wavelength conversion section absorbs the first exciting light and emits excited light having a substantial Lambert distribution. The excited light is collected by the collecting lens 205 and transferred to the first light splitting assembly 204, and it is reflected by the first light splitting assembly 204 to the first relay lens 207. In this process, the optical path correcting element 209*a* has characteristics of transmitting the excited light and hardly affects the excited light, such that it is transmitted directly through the optical path correcting element 209*a*. When the first exciting light is incident to the reflective section of the wavelength conversion device 206 in an obliquely incident manner, the reflective section converts the first exciting light into the second exciting light. The second exciting light and the first exciting light are in a "V"-shaped optical path and collected by the collecting lens 205 and transferred to the optical path correcting element 209*a*. After the second exciting light is reflected by the optical path correcting element 209*a*, the main optical axis thereof coincides with the main optical axis of the excited light, and they are transferred to the first relay lens 207.

In this embodiment, the second exciting light is reflected by the optical path correcting element 209*a* before reaching the first light splitting assembly 204. After being reflected, it coincides with the optical path of the main optical axis of the excited light, such that relative to the excited light, an optical-distance of the second exciting light from the wavelength conversion device 206 to a coincidence position of the excited light and the second exciting light is smaller than an optical-distance of the excited light from the wavelength conversion device 206 to the coincidence position of the excited light and the second exciting light. Thus, an optical-distance from a light spot-imaging of the reflective section of the wavelength conversion device 206 to the incidence surface of the integrator rod 212 is smaller than an optical-distance of a light spot-imaging of the wavelength conversion section of the wavelength conversion device 206 to the incidence surface of the integrator rod 212. According to the imaging formula of $1/u+1/v=1/f$, if it is required to make the imaging positions of the second exciting light and the excited light the same, it is necessary to reduce the imaging focal length f of the second exciting light. By providing the optical path correcting assembly 209 including the concave reflective surface, the imaging focal length is reduced, so that the second exciting light and the excited light can be imaged at the same position, thereby achieving the spatial distribution uniformity of the light emitted from the light source device.

Compared with the technical solution in which the optical path correcting assembly includes the convex reflective surface in the various embodiments above, in the technical solution of this embodiment, part of the excited light is required to pass through the optical path correcting assembly, which causes the uniformity of the excited light to be inevitably affected somewhat. However, since the second exciting light is light having a small divergence angle, an area of the optical path correcting assembly is relatively small. Therefore, in some applications where the requirements are relatively low, the technical solution of the present embodiment can also be accepted.

For the optical processing on the beam performed by various optical elements, the beam transferring process, and the like, which are not described in this embodiment, reference may be made to the description in Embodiment 1, and details will not be described herein again.

Embodiment 6

Figure 7:
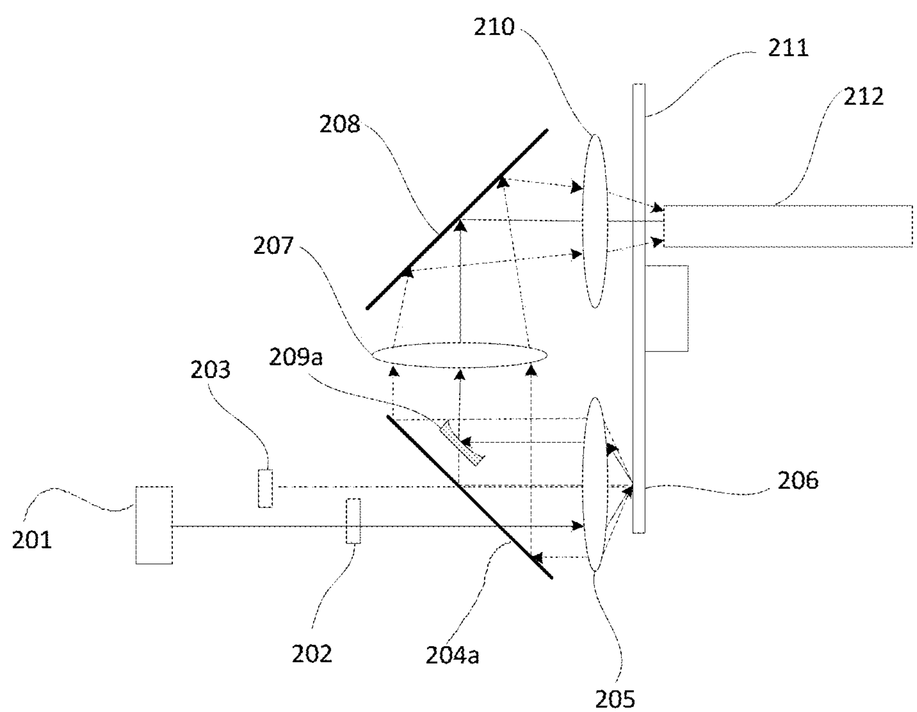
FIG. 7 is a structural schematic diagram of a light source device according to Embodiment 6 of the present disclosure.

Referring to FIG. 7, FIG. 7 is a structural schematic diagram of a light source device according to Embodiment 6 of the present disclosure. The light source device includes a first light source 201, a light guiding system, and a wavelength conversion device 206. The light guiding system includes a first light splitting assembly 204*a*, a collecting lens 205, a first relay lens 207, a reflective sheet 208, an optical path correcting assembly 209*a*, and a second relay lens 210. Further, the light source device further includes a second light source 203, a light homogenizing device 202, a filter wheel 211, and an integrator rod 212.

With respect to Embodiment 5, the present embodiment adds a second light source 203 for emitting compensation light when the wavelength conversion section of the wavelength conversion device 206 is on the optical path of the first exciting light. Further, in comparison with Embodiment 5, the first light splitting assembly 204*a* further includes a compensation light guiding region capable of transmitting the compensation light. For the change of the difference, reference may be made to the change of Embodiment 2 with respect to Embodiment 1, and details will not be described herein again.

With respect to Embodiment 5, in this embodiment, the wavelength conversion device 206 and the filter wheel 211 are disposed coaxially and rotated about the same axis under the driving of one driving device. Moreover, as the structural positions of the wavelength conversion device 206 and the filter wheel 211 change, the optical path between the wavelength conversion device 206 and the filter wheel 211 is also appropriately adjusted. A reflective sheet 208 and a second relay lens 210 are added for guiding the excited light, the second exciting light and the compensation light. The reflective element 208 reflects the excited light, the second exciting light and the compensation light from the first relay lens 207 to the second relay lens 210. The second relay lens 210 collects and transfers the excited light, the second exciting light and the compensation light to the filter wheel 211. For the change of the difference, reference may be made to the change of Embodiment 3 relative to Embodiment 2, and details will not be described herein again.

This embodiment can also be considered as a combination of Embodiment 3 with Embodiment 5. The optical path correcting element 209 including the convex reflective surface in Embodiment 3 is replaced with an optical path correcting element 209*a* including a concave reflective surface. Moreover, the position of the optical path correcting element 209*a* is set on the optical path between the wavelength conversion device 206 and the first light splitting assembly 204*a*.

For the optical processing on the beam performed by various optical elements, the beam transferring process, and the like, which are not described in this embodiment, reference may be made to the description in above embodiments, and details will not be described herein again.

Embodiment 7

Figure 8:
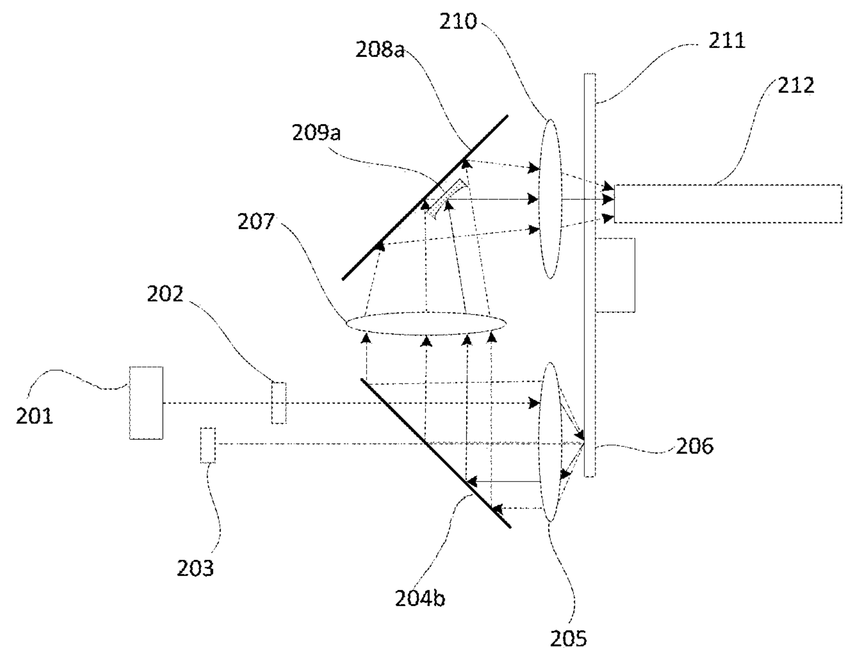
FIG. 8 is a structural schematic diagram of a light source device according to Embodiment 7 of the present disclosure.

Referring to FIG. 8, FIG. 8 is a structural schematic diagram of a light source device according to Embodiment 7 of the present disclosure. The light source device includes a first light source 201, a light guiding system, and a wavelength conversion device 206. The light guiding system includes a first light splitting assembly 204*b*, a collecting lens 205, a first relay lens 207, a second light splitting assembly 208*a*, an optical path correcting assembly 209*a*, and a second relay lens 210. Further, the light source device further includes a second light source 203, a light homogenizing device 202, a filter wheel 211, and an integrator rod 212.

The difference between Embodiment 7 and Embodiment 6 is similar to the difference between Embodiment 4 and Embodiment 3. In this embodiment, the first light splitting assembly 204*b* can also be referred to FIG. 5A, and it includes a first region 204*b*1, a second region 204*b*2, a compensation light guiding region 204*b*3, and a fourth region 204*b*4. The transmission and reflection characteristic of the first region 204*b*1 of the first light splitting assembly 204*b* with respect to the first exciting light is opposite to the transmission and reflection characteristic of the second region 204*b*2 of the first light splitting assembly 204*b* with respect to the second exciting light.

Specifically, the first exciting light emitted by the first light source 201 is homogenized by the light homogenizing device 202 and then incident to the first region 204*b*1 of the first light splitting assembly 204*b* and transmitted. After that, the first exciting light is converged by the collecting lens 205 and then transferred to the wavelength conversion device 206. When the wavelength conversion section of the wavelength conversion device 206 is on the optical path of the first exciting light, the wavelength conversion section absorbs the first exciting light and emits excited light having a substantial Lambert distribution. The excited light is collected by the collecting lens 205 and transferred to the first light splitting assembly 204*b*. The excited light covers most of the region of the first light splitting assembly 204. Except that a small amount of the excited light have a spectrum overlapping with that of the compensation light is transmitted through the compensation light guiding region 204*b*3 and lost, the remaining excited light is reflected to the first relay lens 207. When the reflective section of the wavelength conversion device 206 is on the optical path of the first exciting light, the first exciting light is obliquely incident to the surface of the reflective section and reflected by the reflective section to form second exciting light. The second exciting light and the first exciting light are in a "V"-shaped optical path and collected by the collecting lens 205 and transferred to the second region 204*b*2 of the first light splitting assembly 204*b*. The second exciting light is reflected by the second region 204*b*2 and is reflected to the first relay lens 207. The second light source 203 emits the compensation light. The compensation light is transmitted through the compensation light guiding region 204*b*3 of the first light splitting assembly 204*b*, and after being converged by the collecting lens 205, it is transferred to the wavelength conversion section of the wavelength conversion device 206. After being scattered and reflected by the wavelength conversion section, it becomes compensation light having a substantial Lambert distribution. After the compensation light is collected by the collecting lens 205, except that a small amount of the light is again transmitted through the compensation light guiding region 204*b*3 of the first light splitting assembly 204*b* and lost, the rest is emitted along the same optical path with the excited light.

In the respective beams reaching the first relay lens 207, on the one hand, the second exciting light is collected by the first relay lens 207 and transferred to the optical path correcting element 209*a*, and it is reflected by the optical path correcting assembly 209*a* to the second relay lens 210 and collected by the second relay lens 210 and transferred to the filter wheel 211. On the other hand, the excited light and the compensation light are collected by the first relay lens 207 and transferred to the second light splitting assembly 208*a*, and the second light splitting assembly 208*a* further reflects the excited light and the compensation light to the second relay lens 210. The second relay lens 210 collects the excited light and the compensation light and transfers them to the filter wheel 211. The second exciting light is directly incident to the optical path correcting element 209 without passing the second light splitting assembly 208*a*, while part of the excited light and the compensation light are transmitted through the optical path correcting assembly 209*a*, which inevitably affects the uniformity of the excited light somewhat. However, since the second exciting light is light having a small divergence angle, the optical path correcting assembly 209*a* has a small area. Therefore, in some applications where the requirements are relatively low, the technical solution of the present embodiment can also be accepted.

In this embodiment, after the excited light is sequentially guided through the first light splitting assembly 204*b* and the second light splitting assembly 208*a* respectively, it is transmitted through the optical path correcting assembly 209*a*. The second exciting light is reflected by the optical path correcting assembly 209*a*, and the optical paths of the second exciting light and the excited light are coincident at the emission position of the second exciting light of the optical path correcting assembly 209*a*, such that relative to the excited light, an optical-distance of the second exciting light from the wavelength conversion device 206 to the coincidence position of the second exciting light and the excited light is smaller than an optical-distance of the excited light from the wavelength conversion device 206 to the coincidence position of the second exciting light and the excited light. Thus, an optical-distance from a light spot-imaging of the reflective section of the wavelength conversion device 206 to the incidence surface of the integrator rod 212 is smaller than an optical-distance of a light spot-imaging of the wavelength conversion section of the wavelength conversion device 206 to the incidence surface of the integrator rod 212. The surface of the optical path correcting assembly 209*a*, which reflects the second exciting light, is a concave reflective surface, so that the second exciting light and the excited light can be imaged at the same position, thereby achieving a uniform spatial distribution of the color.

In this embodiment, since the second exciting light is not incident to the second light splitting assembly 208*a*, the second light splitting assembly 208*a* may also be a reflective sheet.

For the optical processing on the beam performed by various optical elements, the beam transferring process, and the like, which are not described in this embodiment, reference may be made to the description in above embodiments, and details will not be described herein again.

Embodiment 8

Figure 9:
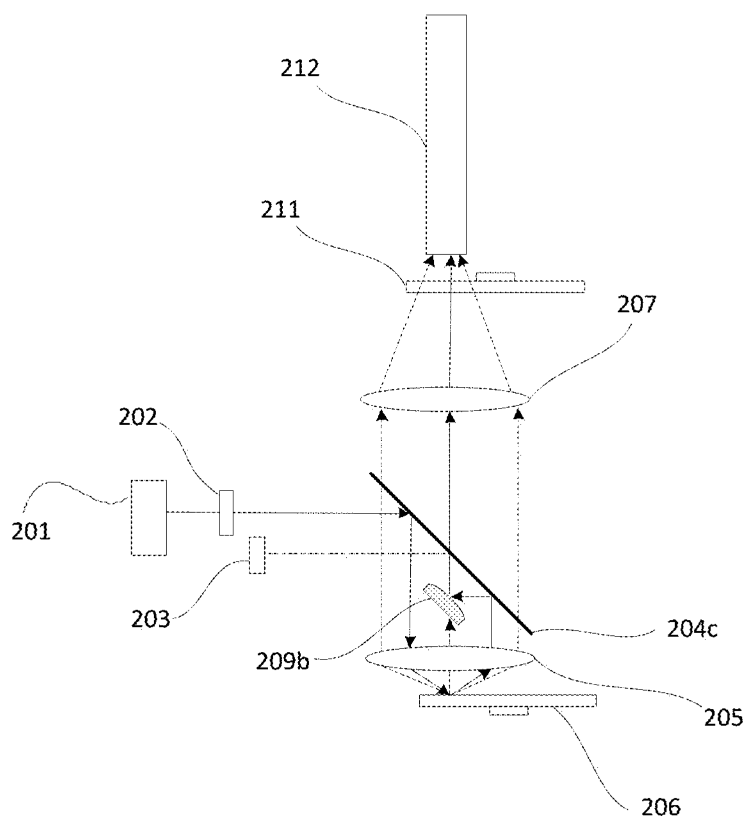
FIG. 9 is a structural schematic diagram of a light source device according to Embodiment 8 of the present disclosure.

Referring to FIG. 9, FIG. 9 is a structural schematic diagram of a light source device according to Embodiment 8 of the present disclosure. The light source device includes a first light source 201, a light guiding system, and a wavelength conversion device 206. The light guiding system includes a first light splitting assembly 204*c*, a collecting lens 205, a relay lens 207 and an optical path correcting assembly 209. Further, the light source device further includes a second light source 203, a light homogenizing device 202, a filter wheel 211, and an integrator rod 212.

In each of the above embodiments, the first exciting light is homogenized by the light homogenizing device 202, transmitted through the first light splitting assembly 204/204*a*/204*b*, and then incident to the wavelength conversion device 206. In contrast, in the present embodiment, the first exciting light is reflected by the first light splitting assembly 204*c*, and then incident to the wavelength conversion device 206 via the collecting lens 205.

Figure 9A:
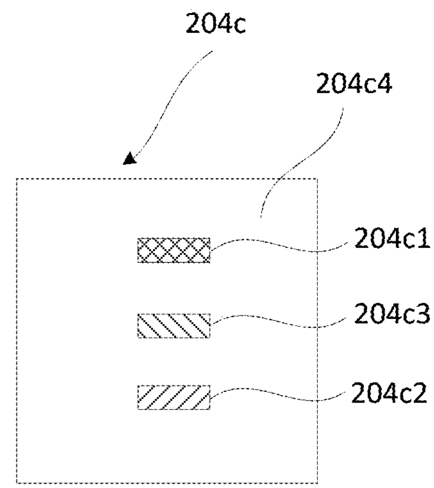
FIG. 9A is a structural schematic diagram of a first light splitting assembly in FIG. 9.

As shown in FIG. 9A, in the present embodiment, the first light splitting assembly 204*c* includes a first region 204*c*1, a second region 204*c*2, a compensation light guiding region 204*c*3, and a fourth region 204*c*4. The first region 204*c*1 reflects the first exciting light and transmits the excited light and the compensation light. The second region 204*c*2 reflects the second exciting light and transmits the excited light and the compensation light. The compensation light guiding region 204*c*3 reflects the compensation light and transmits the second exciting light and at least part of the excited light. The fourth region 204*c*4 transmits the excited light and the compensation light.

Specifically, after the first exciting light emitted by the first light source 201 is homogenized by the light homogenizing device 202, it is incident to the first region 204*c*1 of the first light splitting assembly 204*c* and reflected by this region. Then, it is incident to the collecting lens 205, converged by the collecting lens 205 and then incident to the wavelength conversion device 206.

When the reflective section of the wavelength conversion device 206 is on the optical path of the first exciting light, the first exciting light is incident to the reflective section in such a manner that the main optical axis is obliquely incident, and it is reflected to form second exciting light. The second exciting light forms a "V"-shaped optical path with the first exciting light, and it is collected by the collecting lens 205 and transferred to the second region 204*c*2 of the first light splitting assembly 204*c*. The second exciting light is reflected by the second region 204*c*2 and is reflected to the optical path correcting element 209*b*. The optical path correcting element 209*b* includes a convex reflective surface. The convex reflective surface reflects the second exciting light into the exiting optical channel. When the wavelength conversion section of the wavelength conversion device 206 is located on the optical path of the first exciting light, the wavelength conversion section absorbs the first exciting light and emits excited light. The excited light has a substantial Lambert distribution, and after being collected by the collecting lens 205, the excited light is transmitted through the first light splitting assembly 204*c* to enter the exiting optical channel.

In this embodiment, the first light splitting assembly 204*c* has opposite transmission and reflection characteristics on the first exciting light and the excited light, and functions to distinguish the optical paths of the first exciting light from the excited light. Before being incident to the first light splitting assembly 204*c*, a portion of the excited light is incident to the optical path correcting element 209*b*, and it is directly transmitted through the optical path correcting element 209*b*.

After the compensation light emitted by the second light source 203 is reflected by the compensation light guiding region 204*c*3 of the first light splitting assembly 204*c*, it is collected by the collecting lens 205, transferred to the wavelength conversion device 206, and scattered and reflected by the wavelength conversion section of the wavelength conversion device 206 to form light having a substantial Lambert distribution. It is then collected by the collecting lens 205 and transferred to the first light splitting assembly 204*c*. At this time, the compensation light and the excited light are combined into one beam. Except that a small amount of the compensation light and the excited light having a wavelength range overlapping that of the compensation light are reflected by the compensation light guiding region 204*c*3 and lost, the remaining compensation light and the excited light are transmitted through the region of the first light splitting assembly 204*c* other than the compensation light guiding region 204*c*3 and enter the exiting optical channel.

In the present embodiment, the optical path correcting element 209*b* is disposed on the optical path between the wavelength conversion device 206 and the first light splitting assembly 204*c*. By the optical path correcting element 209*b*, the main optical axes of the second exciting light, the excited light and the compensation light coincide, and one beam of light is formed and incident to the first light splitting assembly 204*c*. The excited light and the compensation light are light of the Lambert distribution and cover most of the region of the first light splitting assembly 204*c*, while the second exciting light is still light having a small divergence angle and in a Gaussian distribution, and the second exciting light is incident to the compensation light guiding region 204*c*3 and transmitted.

The first light splitting assembly 204*c* in this embodiment is a whole, and each region thereon is achieved by plating or opening. In another embodiment, since the first light splitting assembly transmits the excited light, the first light splitting assembly may also be disposed as several relatively independent filters to achieve the technical effect of the present disclosure, for example, providing the first region 204*c*1 filter, the second region 204*c*2 filter and the compensation light guiding region 204*c*3 filter which are disposed independently of each other.

In a variant embodiment of the present embodiment, the second region 204*c*2 transmits the second exciting light. A reflective sheet is provided on the optical path of the second exciting light that has been transmitted through the second region and used for changing the direction of the second exciting light to make it be incident to the optical path correcting element 209*b* (also including the convex reflective surface). The second exciting light, after being reflected by the optical path correcting element 209*b*, coincides with the main optical axis of the excited light transmitted through the optical path correcting element 209*b*. In this embodiment, the optical path correcting element 209*b* is disposed on the optical path behind the first light splitting assembly 204*c*. That is, the excited light first passes through the first light splitting assembly 204*c* and then passes through the optical path correcting element 209*b*.

In a variant of the embodiment, the second light source 203 may not be provided. Correspondingly, the compensation light guiding region 204*c*3 can also be omitted, but the original compensation light guiding region 204*c*3 needs to be able to transmit the second exciting light.

In this embodiment, before the beam reaches 207, the second exciting light, the compensation light and the excited light have become one beam of light whose main optical axes coincide, and the positions of the filter wheel 211 and the integrator rod 212 can be arbitrarily changed by providing the mirror. For example, by providing two mirrors that are positioned at 45°, the beam is turned over by 180°, and the filter wheel 211 and the wavelength conversion device 206 are disposed coaxially and formed into one piece, as in Embodiment 3, Embodiment 4, Embodiment 6, and Embodiment 7.

For the optical processing on the beam performed by various optical elements, the beam transferring process, and the like, which are not described in this embodiment, reference may be made to the description in above embodiments, and details will not be described herein again.

Embodiment 8 transforms the characteristics of the first light splitting assembly with respect to Embodiment 1 to Embodiment 7 described above, and the transmission and reflection characteristics on the first exciting light and the excited light are exchanged under the premise that the transmission and reflection characteristics of the first light splitting assembly on the first exciting light and the excited light are opposite. The transformation can also be applied to Embodiment 1 to Embodiment 7, to change the corresponding transmission and reflection characteristics of the respective mirrors, and the reflective sheet or the wavelength filter is increased or decreased when needed, which will not be described here.

Embodiment 9

Figure 10:
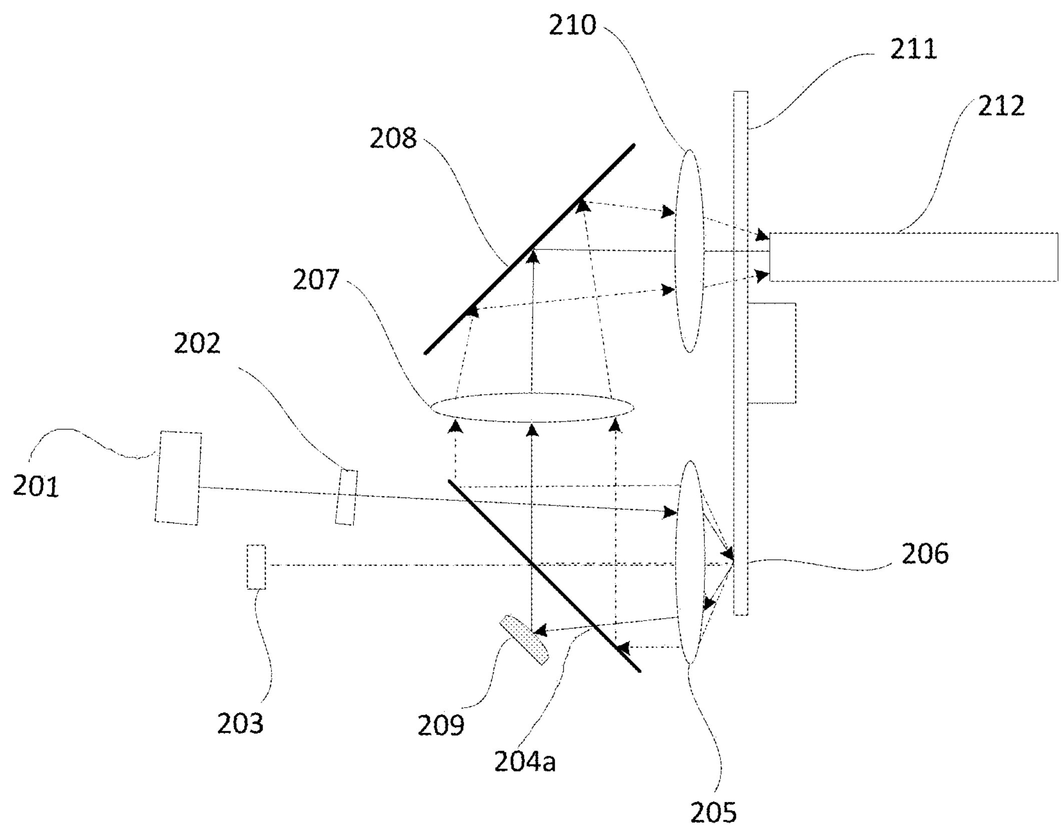
FIG. 10 is a structural schematic diagram of a light source device according to Embodiment 9 of the present disclosure.

Referring to FIG. 10, FIG. 10 is a structural schematic diagram of a light source device according to Embodiment 9 of the present disclosure. The light source device includes a first light source 201, a light guiding system, and a wavelength conversion device 206. The light guiding system includes a first light splitting assembly 204*a*, a collecting lens 205, a first relay lens 207, a reflective sheet 208, an optical path correcting assembly 209, and a second relay lens 210. Further, the light source device further includes a second light source 203, a light homogenizing device 202, a filter wheel 211, and an integrator rod 212.

Compared with Embodiment 3, the difference of this embodiment is that after the first exciting light emitted by the first light source 201 is homogenized by the light homogenizing device 202, it is incident to the collecting lens 205 with the main optical axis being not perpendicular to the surface of the wavelength conversion device 206. Therefore, before the first exciting light is incident to the collecting lens 205, the direction of its main optical axis is not parallel with the central axis of the collecting lens 205.

Due to the reflection symmetry, after the second exciting light is collected by the collecting lens 205 and emitted, the main optical axis of the second exciting light is not perpendicular to the surface of the wavelength conversion device 206. This embodiment causes the included angle between the first exciting light and the second exciting light to be further enlarged, thereby avoiding an influence between the two beams.

In one embodiment, the optical path correcting assembly 209 is disposed to be not in parallel with the first light splitting assembly, and an included angle between the second exciting light incident to the optical path correcting assembly 209 and the second exciting light reflected by the optical path correcting assembly 209 is not equal to 90°. Due to an angular shift of the incident direction of the first exciting light, the direction of the second exciting light is also angularly shifted, while the excited light is not affected. Therefore, in order to enable the second exciting light to coincide with the main optical axis of the excited light, it is necessary to control the direction of the second exciting light by modifying the placement angle of the optical path correcting assembly. In one embodiment, after the second exciting light is reflected by the optical path correcting assembly, the angle is changed by 90°±4°. The technical solution can control the coincidence of the optical paths of the second exciting light and the excited light by the placement angle of the optical path correcting assembly in a state where the optical path slightly deviates, thereby improving the degree of freedom in designing the light source device.

The distinguishing features of this embodiment with respect to Embodiment 3 can also be combined with other various embodiments. For the optical processing on the beam performed by various optical elements, the beam transferring process, and the like, which are not described in this embodiment, reference may be made to the description in above embodiments, and details will not be described herein again.

Embodiment 10

Figure 11:
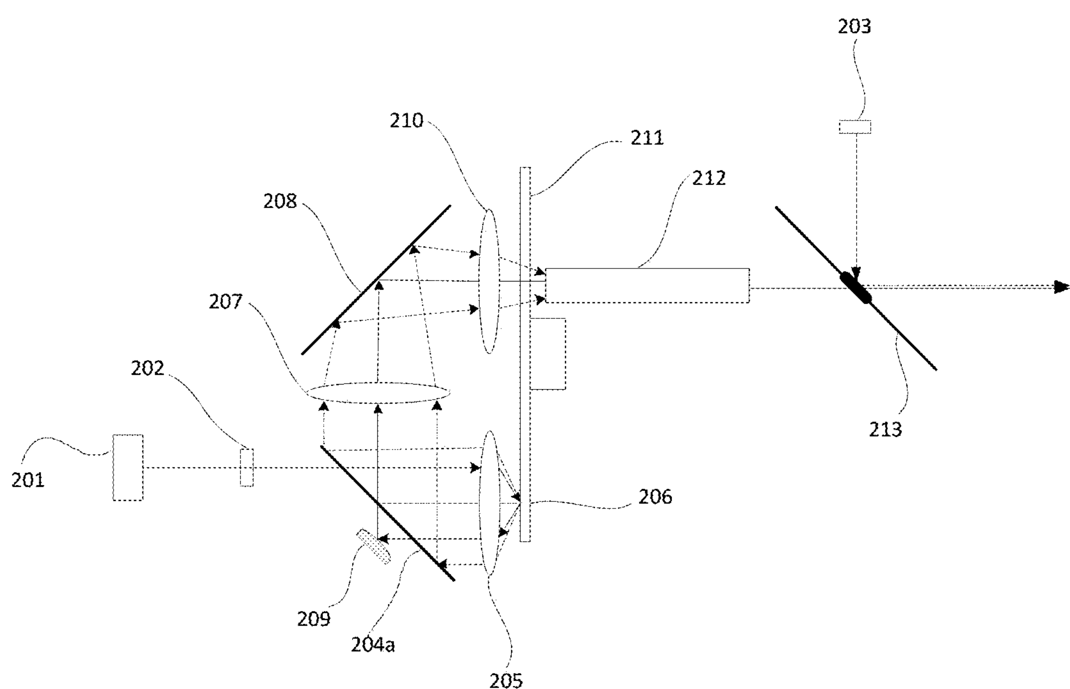
FIG. 11 is a structural schematic diagram of a light source device according to Embodiment 10 of the present disclosure.

Referring to FIG. 11, FIG. 11 is a structural schematic diagram of a light source device according to Embodiment 10 of the present disclosure. The light source device includes a first light source 201, a light guiding system, and a wavelength conversion device 206. The light guiding system includes a first light splitting assembly 204*a*, a collecting lens 205, a first relay lens 207, a reflective sheet 208, an optical path correcting assembly 209, and a second relay lens 210. In addition, the light source device further includes a second light source 203, a light homogenizing device 202, a filter wheel 211, an integrator rod 212, and a compensation light guiding assembly 213.

Different from the above embodiment in which the second light source 203 is included, in each of the above embodiments, the compensation light emitted by the second light source 203 is first incident to the wavelength conversion section, and then scattered and reflected to form light of a Lambert distribution, and it is emitted together with the excited light. That is, the compensation light and the excited light are combined at the position of the light emitting surface of the wavelength conversion section. However, the compensation light emitted by the second light source 203 in Embodiment 10 is not incident to the wavelength conversion section but combined with the excited light by the compensation light guiding assembly 213 after the excited light is generated. This technical solution avoids the light loss caused by the compensation light being scattered by the wavelength conversion device, and greatly improves the light utilization rate of the compensation light.

In this embodiment, the compensation light guiding assembly 213 is disposed on the exiting optical path of the excited light. Specifically, it is disposed on the exiting optical path of the integrator rod 212, and the excited light and the compensation light are respectively incident to the compensation light guiding assembly 213 from two directions and combined into one beam. The compensation light guiding assembly 213 can be implemented by providing a small reflective region on a transparent substrate as shown in the drawing. The compensation light is incident to the small reflective region and reflected by the small reflective region. The excited light covers most of the region of the compensation light guiding assembly 213, and the excited light incident to the non-small reflective region of the transparent substrate is directly transmitted. Further, it is also possible to, by plating, make the small reflective region only reflect the light having the wavelength range of the compensation light and transmit the light having other wavelength ranges. In one embodiment, the transmission and reflection characteristics of the compensation light guiding assembly 213 on the excited light and the compensation light can also be exchanged, and this technical solution can be achieved by providing a compensation light transmitting region on the reflective sheet.

In the present embodiment, the compensation light guiding assembly 213 is disposed on the exiting optical path of the integrator rod 212. In other embodiments, the compensation light guiding assembly 213 can also be disposed at other positions. For example, it may be disposed on the optical path of the incident light of the integrator rod 212 or on the optical path between the wavelength conversion device and the filter wheel. In summary, an aim of the technical solution of this embodiment is to prevent the compensation light from being incident to the wavelength conversion section, thereby avoiding the light loss caused by the compensation light being scattered by the wavelength conversion section.

The technical features of the combination of the compensation light emitted by the second light source 203 and the excited light in this embodiment can be applied to other embodiments of the present disclosure. For the optical processing on the beam performed by various optical elements, the beam transferring process, and the like, which are not described in this embodiment, reference may be made to the description in above embodiments, and details will not be described herein again.

Embodiment 11

In the above Embodiments 1 to 10 and various modified embodiments, the optical path correcting assemblies all have curved reflective surfaces, in which a convex reflective surface is used to diverge a beam or a concave reflective surface is used to converge a beam, and each optical path correcting assembly simultaneously achieves changing of the propagation direction of the second exciting light and changing of the beam angular distribution through one element.

In contrast, in the present embodiment, the function of the curved reflective surface is realized by a combination of two optical elements, in which the direction of the second exciting light is changed by a planar reflective surface, and the angular distribution of the second exciting light is changed by a lens. In one embodiment, the convex reflective surface is replaced by a combination of a planar reflective surface and a concave lens, such that not only the second exciting light can pass through the concave lens first and then be incident to the planar reflective surface, but also the second exciting light can be reflected by the planar reflective surface first and then transmitted through the concave lens. In another embodiment, the concave reflective surface is replaced by a combination of a planar reflective surface and a convex lens, such that not only the second exciting light can pass through the convex lens first and then be incident to the planar reflective surface, but also the second exciting light can be reflected by the planar reflective surface first and then transmitted through the convex lens.

In this embodiment, the optical path correcting assembly is replaced. For an embodiment in which a combination of a planar reflective surface and a concave lens is used instead of the convex reflective surface, reference, regarding to other assemblies, may be made to the specific description of the technical solution in which the optical path correcting assembly using the convex reflective surface is adopted in the above embodiments; for an embodiment in which a combination of a planar reflective surface and a convex lens is used in place of the concave reflective surface, reference, regarding to other assemblies, may be made to the specific description of the technical solution in which the optical path correcting assembly using the concave reflective surface is adopted in the above embodiments, but it is required to satisfy that the transmission and reflection characteristic of the planar reflective surface with respect to the excited light is the same as that of the original curved reflective surface.

It can be understood that on the basis of the curved reflective surface, one or more planar reflective surfaces can be further added and formed into the optical path correcting assembly together with the curved reflective surface, as long as the main optical axis of the second exciting light after the last reflection is coincident with the main optical axis of the excited light.

The present disclosure also provides a projection system, and the projection system includes the light source device in each of the above embodiments, and further includes a light modulating device and a lens device. By projecting the light emitted by the light source device on a light modulator of the light modulating device and modulating the spatial distribution of the light according to an input image signal, the modulated light is emitted by a lens device to form an image, thereby achieving a projection display function.

The projection display system of the present disclosure can be applied to projectors such as cinema projectors, engineering projectors, pico-projectors, educational projectors, wall projectors, laser televisions, etc., and it can also be applied to image lighting such as image projection lamps, transportation (vehicles, ships and airplanes) lights, searchlights, stage lights and the like.

The embodiments described in this specification are only part of the embodiments of the present disclosure, and not all of the embodiments. All other embodiments obtained by those of ordinary skill in the art based on the embodiments of the present disclosure without creative efforts, and feasible technical solutions consisting of some or all of the technical features of any two or more embodiments of the present application are within the scope of the present disclosure.

The above description is only embodiments of the present disclosure and does not limit the patent scope of the present disclosure. All equivalent structures or equivalent process transformations made using the specification and the drawings of the present disclosure and those directly or indirectly applied in other related technical fields are included in the scope of patent of the present disclosure.

What is claimed is:

1. A light source device, comprising a first light source, a light guiding system, and a wavelength conversion device; wherein:

the first light source is configured to emit first exciting light, and the first exciting light is incident to the light guiding system along an incidence light channel;

the light guiding system is configured to guide the first exciting light to the wavelength conversion device;

the wavelength conversion device comprises a wavelength conversion section and a reflective section, and periodically moves in such a manner that the wavelength conversion section and the reflective section are periodically located on an optical path of the first exciting light in time division, wherein the wavelength conversion section absorbs the first exciting light and emits excited light, and the first exciting light is obliquely incident to a surface of the reflective section and is reflected to form second exciting light; and the light guiding system is further configured to collect the excited light and the second exciting light and guide the excited light and the second exciting light to exit along an exiting light channel;

wherein the light guiding system comprises an optical path correcting assembly, which is located on an optical path of the second exciting light and configured to reflect the second exciting light in such a manner that a main optical axis of the reflected second exciting light coincides with a main optical axis of the excited light and further to change a beam angular distribution of the second exciting light in such a manner that imaging positions of the second exciting light and the excited light coincide in a direction of beam propagation; and wherein the optical path correcting assembly comprises a curved reflective surface configured to change both a direction and the beam angular distribution of the second exciting light.

2. The light source device according to claim 1, wherein the optical path correcting assembly comprises a convex reflective surface, and wherein from the wavelength conversion device to a position where the second exciting light and the excited light coincide, an optical-distance of the second exciting light is larger than that of the excited light.

3. The light source device according to claim 1, wherein the light guiding system comprises a first light splitting assembly comprising a first region and a second region that do not overlap, wherein the first exciting light is incident to the first region, and the second exciting light is incident to the second region, and wherein a transmission and reflection characteristic of the first region with respect to the first exciting light is identical to that of the second region with respect to the second exciting light; and wherein the second exciting light is transferred to the optical path correcting assembly after passing the second region, and optical paths of the second exciting light and the excited light coincide at a position of the first light splitting assembly where the excited light exits.

4. The light source device according to claim 1, wherein the light guiding system comprises a first light splitting assembly comprising a first region and a second region that do not overlap, wherein the first exciting light is incident to the first region, and the second exciting light is incident to the second region, and wherein a transmission and reflection characteristic of the first region with respect to the first exciting light is opposite to that of the second region with respect to the second exciting light; and wherein the light guiding system further comprises a second light splitting assembly, the second exciting light is transferred to the optical path correcting assembly after passing the second light splitting assembly, and optical paths of the second exciting light and the excited light coincide at a position of the second light splitting assembly where the excited light exits.

5. The light source device according to claim 1, wherein the optical path correcting assembly comprises a concave reflective surface, and wherein from the wavelength conversion device to a position where the second exciting light and the excited light coincide, an optical-distance of the second exciting light is smaller than that of the excited light, and the optical path correcting assembly transmits the excited light.

6. The light source device according to claim 1, wherein the light guiding system further comprises a first light splitting assembly comprising a first region, wherein the first exciting light is incident to the first region, and the second exciting light does not pass the first light splitting assembly, and the optical paths of the second exciting light and the excited light coincide at a position of the optical path correcting assembly where the second exciting light exits.

7. The light source device according to claim 1, wherein the light guiding system further comprises a first light splitting assembly, the first light splitting assembly comprises a first region and a second region which do not overlap, the first exciting light is incident to the first region, the second exciting light is incident to the second region, a transmission and reflection characteristic of the first region with respect to the first exciting light is opposite to that of the second region with respect to the second exciting light; and wherein the light guiding system further comprises a second light splitting assembly, and the second exciting light does not pass the second light splitting assembly, wherein the excited light is transmitted through the optical path correcting assembly after being sequentially guided by the first light splitting assembly and the second light splitting assembly, and optical paths of the second exciting light and the excited light coincide at a position of the optical path correcting assembly where the second exciting light exits.

8. The light source device according to claim 1, wherein the light source device further comprises a second light source configured to emit compensation light when the wavelength conversion section is located on the optical path of the first exciting light, wherein a wavelength range of the compensation light overlaps with that of the excited light, and wherein the light guiding system comprises a compensation light guiding region for guiding the compensation light to the wavelength conversion device.

9. The light source device according to claim 1, further comprising a second light source configured to emit compensation light and a compensation light guiding assembly disposed on an exiting optical path of the excited light, wherein wavelength of the compensation light overlaps with that of the excited lights, and the compensation light and the excited light are combined by the compensation light guiding assembly.

10. The light source device according to claim 1, wherein an included angle between the second exciting light incident to the optical path correcting assembly and the second exciting light reflected by the optical path correcting assembly is not equal to 90°.

11. The light source device according to claim 1, further comprising a filter wheel, wherein the filter wheel comprises a scattering-transmitting section and a color-retouching transmitting section, the scattering-transmitting section is used for scattering the second exciting light, the color-retouching transmitting section is used to retouch the color of the excited light, the filter wheel periodically moves in such a manner that respective sections of the filter wheel are in one-to-one correspondence with respective sections of the wavelength conversion device.

12. The light source device according to claim 11, wherein the filter wheel and the wavelength conversion device are disposed coaxially and rotate about a same axis under driving of one driving device.

13. The light source device according to claim 11, wherein the scattering-transmission section is provided with a Top-hat type scattering sheet or a single-row fly-eye structure arranged in a hexagon.

14. A projection system comprising a light source device, wherein the projection system further comprises a light modulating device and a lens device, wherein:

the light source device comprises a first light source, a light guiding system, and a wavelength conversion device;

the first light source is configured to emit first exciting light, and the first exciting light is incident to the light guiding system along an incidence light channel;

the light guiding system is configured to guide the first exciting light to the wavelength conversion device;

the wavelength conversion device comprises a wavelength conversion section and a reflective section, and periodically moves in such a manner that the wavelength conversion section and the reflective section are periodically located on an optical path of the first exciting light in time division, wherein the wavelength conversion section absorbs the first exciting light and emits excited light, and the first exciting light is obliquely incident to a surface of the reflective section and is reflected to form second exciting light; and the light guiding system is further configured to collect the excited light and the second exciting light and guide the excited light and the second exciting light to exit along an exiting light channel;

wherein the light guiding system comprises an optical path correcting assembly, which is located on an optical path of the second exciting light and configured to reflect the second exciting light in such a manner that a main optical axis of the reflected second exciting light coincides with a main optical axis of the excited light and further to change a beam angular distribution of the second exciting light in such a manner that imaging positions of the second exciting light and the excited light coincide in a direction of beam propagation; and wherein the optical path correcting assembly comprises a curved reflective surface configured to change both a direction and the beam angular distribution of the second exciting light.

15. A light source device, comprising a first light source, a light guiding system, and a wavelength conversion device; wherein:

the first light source is configured to emit first exciting light, and the first exciting light is incident to the light guiding system along an incidence light channel;

the light guiding system is configured to guide the first exciting light to the wavelength conversion device;

the wavelength conversion device comprises a wavelength conversion section and a reflective section, and periodically moves in such a manner that the wavelength conversion section and the reflective section are periodically located on an optical path of the first exciting light in time division, wherein the wavelength conversion section absorbs the first exciting light and emits excited light, and the first exciting light is obliquely incident to a surface of the reflective section and is reflected to form second exciting light; and the light guiding system is further configured to collect the excited light and the second exciting light and guide the excited light and the second exciting light to exit along an exiting light channel;

wherein the light guiding system comprises an optical path correcting assembly, which is located on an optical path of the second exciting light and configured to reflect the second exciting light in such a manner that a main optical axis of the reflected second exciting light coincides with a main optical axis of the excited light and further to change a beam angular distribution of the second exciting light in such a manner that imaging positions of the second exciting light and the excited light coincide in a direction of beam propagation; and wherein the optical path correcting assembly comprises a planar reflective surface and a lens, the planar reflective surface is configured to change the direction of the second exciting light, and the lens is configured to change the angular distribution of the second exciting light.

16. The light source device according to claim 15, wherein the optical path correcting assembly comprises a combination of a planar reflective surface and a concave lens, and wherein from the wavelength conversion device to a position where the second exciting light and the excited light coincide, an optical-distance of the second exciting light is larger than that of the excited light.

17. The light source device according to claim 15, wherein the optical path correcting assembly comprises a combination of a planar reflective surface and a convex lens, and wherein from the wavelength conversion device to a position where the second exciting light and the excited light coincide, an optical-distance of the second exciting light is smaller than that of the excited light, and the optical path correcting assembly transmits the excited light.

* * * * *